United States Patent [19]

Neuman et al.

[11] Patent Number: 5,609,838

[45] Date of Patent: Mar. 11, 1997

[54] EQUILIBRIUM PRODUCTION OF SODIUM CARBONATE FROM SODIUM BICARBONATE

[75] Inventors: Thomas H. Neuman, Salt Lake City, Utah; Richard W. Chastain, Lyman, Wyo.

[73] Assignee: Tg Soda Ash, Inc., Granger, Wyo.

[21] Appl. No.: 489,103

[22] Filed: Jun. 9, 1995

[51] Int. Cl.[6] .................................................. C01D 7/37
[52] U.S. Cl. ............................ 423/206.1; 423/206.2; 423/427
[58] Field of Search .................. 423/427, 206.2, 423/206.1

[56] References Cited

U.S. PATENT DOCUMENTS

| | | | |
|---|---|---|---|
| 1,853,275 | 4/1932 | Houghton et al. | |
| 2,049,249 | 7/1936 | Cunningham | 23/63 |
| 2,133,455 | 10/1938 | Keene et al. | 23/63 |
| 2,193,817 | 3/1940 | Houghton | 23/38 |
| 2,388,009 | 10/1945 | Pike | 23/38 |
| 2,625,384 | 4/1953 | Pike et al. | 262/3 |
| 3,028,215 | 4/1962 | Frint | 423/206 T |
| 3,050,290 | 8/1962 | Caldwell et al. | 262/3 |
| 3,113,834 | 12/1963 | Beecher et al. | 23/63 |
| 3,119,655 | 1/1964 | Frint et al. | 23/63 |
| 3,184,287 | 5/1965 | Gancy et al. | 23/63 |
| 3,212,848 | 10/1965 | Tasiaux | 423/421 |
| 3,246,962 | 4/1966 | Miller | 23/311 |
| 3,264,057 | 8/1966 | Miller | 23/63 |
| 3,451,767 | 8/1969 | Saeman et al. | 23/63 |
| 3,455,647 | 7/1969 | Gloster | 23/63 |
| 3,498,744 | 3/1970 | Frint et al. | 423/206 T |
| 3,667,902 | 6/1972 | Kay et al. | 423/427 |
| 3,870,780 | 3/1975 | Guptill | 423/206 |
| 3,953,073 | 4/1976 | Kube | 299/5 |
| 3,984,527 | 10/1976 | Gancy et al. | 423/427 |
| 4,039,617 | 8/1977 | Kuo | 423/186 |
| 4,039,618 | 8/1977 | Gancy et al. | 423/206 T |
| 4,148,684 | 4/1979 | Farin | 162/36 |
| 4,252,781 | 2/1981 | Fujita et al. | 423/427 |
| 4,344,650 | 8/1982 | Pinsky et al. | 299/4 |
| 4,401,635 | 8/1983 | Frint | 23/302 T |
| 4,498,706 | 2/1985 | Kardi et al. | 23/302 T |
| 4,652,054 | 3/1987 | Copenhafer et al. | 299/5 |
| 4,869,882 | 9/1989 | Dome et al. | 423/206 T |
| 5,043,149 | 8/1991 | Frint et al. | 423/206 T |
| 5,262,134 | 11/1993 | Frint et al. | 423/184 |
| 5,283,054 | 2/1994 | Copenhafer et al. | 423/206.2 T |

FOREIGN PATENT DOCUMENTS

| 15822 | 7/1892 | United Kingdom | 423/427 |
|---|---|---|---|
| 883202 | 11/1961 | United Kingdom | 423/427 |

OTHER PUBLICATIONS

Sarbar, M., Covington, A., Nuttall, R. and Goldberg, R., "The Activity and Osmotic Coefficients of Aqueous Sodium Bicarbonate Solutions," J. Chem. Thermodynamics, 14, 967–76, 1982.

Vanderzee, C., "Thermodynamic properties of Solutions of a Hydrolyzing Electrolyte: relative partial molar enthalpies . . . and solute activity coefficients of aqueous sodium carbonate," J. Chem Thermodynamics, 14, 1051–67, 1982.

Butler, J. N., *Carbon Dioxide Equilibria and Their Applications*, Lewis Publishers, Chelsea, MI 1991.

Garrett, D., *Natural Soda Ash*, Von Nostrand Reinhold, New York, NY, 1992, pp. 336–355.

(List continued on next page.)

*Primary Examiner*—Wayne Langel
*Attorney, Agent, or Firm*—Bell, Seltzer, Park & Gibson, P.A.

[57] ABSTRACT

A process for producing sodium carbonate and other sodium-based chemicals from an aqueous solution containing sodium bicarbonate by contacting an aqueous solution of a bicarbonate-containing composition with a gas that is predominately other than carbon dioxide in an amount and for a time adequate to cause a sufficient amount of carbon dioxide to leave the aqueous solution to reduce the amount of bicarbonate ion in the solution by converting the bicarbonate to carbonate as carbon dioxide leaves the solution and thereafter converting the remaining solution to other sodium salts.

55 Claims, 8 Drawing Sheets

OTHER PUBLICATIONS

Harned, H. and Manweiler, G., "The Thermodynamics of Ionized Water in Sodium Chloride Solutions," 57, 1873–76, Oct. 1935.

Yakovlev, V. A., Verkh, E. A. and Poltoratskii, G. M., "Constant of the Second-Stage of Dissociation of Carbonic Acid in Concentrated Solutions of Sodium Sulfate," Zh. Prikl. Khim (Leningrad), 62(6), 1365–6, 1989.

Rao, D. P., "Design of Packed Towers for Absorption and Desportion of Carbon Dioxide Using Hot Promoted Potassium Carbonate Solution," Gas Separation & Purification, 5, 177–80, 1991.

Pohorecki, R., and Kucharski, E., "Desportion with Chemical Reaction in the System $CO_2$–aqueous Solution of Potassium Carbonate," Chemical Engineering Journal, 46, 1–7, 1991.

Peiper, J. and Pitzer, K., "Thermodynamics of Aqueous Carbonate Solutions Including Mixtures of Sodium Carbonate, Bicarbonate and Chloride," J. Chem. Thermodynamics, 14, 618–38 (1982).

Danckwerts, P. V. and Mahajani, V. V., "The Stripping of $CO_2$ from Amine Promoted Potash Solutions at 100° C", Chemical Engineering Science, 38, 321–7, 1983.

Nii, S., Iwata, T., Takahashi, K. and Takeuchi, H., "Regeneration of $CO_2$–Loaded Carbonate Solution by Reducing Pressure," J. Chem. Eng. of Japan, vol. 14, No. 2, 148–53, 1995.

Taylor, E., "Thermodynamics of Sodium Carbonate in Solution," Institute of Paper Chemistry (rec'd Feb. 14, 1956), reprinted Jul., 1955, 653–57.

Eickmeyer, A. G., "Carbon Dioxide Removal, IV, Catacarb", Fertilizer Science Technology Series, 2, 165–9, 1974.

Savage, D., Astarita, G., and Joshi, S., "Chemical Absorption and Desorption of Carbon Dioxide from Hot Carbonate Solutions," Chemical Engineering Science, 35, 1513–22, 1980.

EQUILIBRIUM PRODUCTION OF SODIUM CARBONATE FROM SODIUM BICARBONATE

FIELD OF THE INVENTION

The present invention relates to a process for recovering sodium carbonate or other sodium based chemicals from solutions containing sodium bicarbonate and especially sodium bicarbonate solutions obtained from solution mining trona deposits.

BACKGROUND OF THE INVENTION

Sodium carbonate (soda ash) is approximately the 11th highest volume chemical produced in the United States. It is used in the manufacture of glass, chemicals, soaps and detergents, and aluminum. It is also used in textile processing, petroleum refining, and water treatment.

For many years, sodium carbonate was produced by the Solvay process in which carbon dioxide was dissolved in water containing ammonia ($NH_3$) and salt (NaCl) to precipitate sodium bicarbonate which was then separated by filtration and heated to form sodium carbonate. Because of high energy costs and problems with disposing of chloride-containing waste streams generated by the Solvay process, it has been abandoned in the United States in favor of obtaining sodium carbonate from naturally occurring trona deposits. Trona deposits are located in Utah, California, and Wyoming. Green River, Wyo. contains the largest known trona deposits in the United States and is actively mined by five companies.

Crude trona ("trona ore") consists primarily (80–95 percent) of sodium sesquicarbonate ($Na_2CO_3.NaHCO_b.2H_2O$) and in lesser amounts, sodium chloride (NaCl), sodium sulfate ($Na_2SO_4$), organic matter, and insolubles such as clay and shales. In Wyoming, these deposits are located in 25 separate identified beds or zones ranging from 800 to 2800 feet below the earth's surface and are typically extracted by conventional mining techniques such as the room and pillar and longwall methods. The cost of these conventional mining methods is high, representing as much as 35 percent of the production costs for soda ash. Furthermore, recovering trona by these methods becomes more difficult as the best, most thickly bedded trona deposits are depleted. As a result, recovery of carbonate values from trona has fallen in some cases by as much as 5 to 7 percent. Development of new reserves is expensive, requiring a capital investment of as much as $100 to 150 million in 1995 dollars to sink new mining shafts and to install related equipment.

As its chemical composition indicates, trona ore requires processing in order to recover the sodium carbonate. Most of the sodium carbonate from the Green River deposits is produced from the conventionally mined trona ore via the "monohydrate" process. The "monohydrate" process involves crushing and screening the trona ore which, as noted above, contains both sodium carbonate ($Na_2CO_3$) and sodium bicarbonate ($NaHCO_3$) as well as impurities such as silicates and organic matter. After the trona ore is screened, it is calcined (i.e., heated) at temperatures greater than 150° C. to convert sodium bicarbonate to sodium carbonate. The crude soda ash is dissolved in a recycled liquor which is then clarified and filtered to remove the insoluble solids. The liquor is sometimes carbon treated to remove dissolved organic matter which may cause foaming and color problems in the final product, and is again filtered to remove entrained carbon before going to a monohydrate crystallizer unit, an evaporator system generally having one or more effects (evaporators), where sodium carbonate monohydrate is crystallized. The resulting slurry is centrifuged, and the separated monohydrate crystals are sent to dryers to produce soda ash. The soluble impurities are recycled with the centrate to the crystallizer where they are further concentrated. To maintain final product quality, it eventually becomes necessary to remove the impurities with a crystallizer purge stream.

The production of sodium carbonate using the combination of conventional mining techniques followed by the monohydrate process is becoming more expensive as the higher quality trona deposits become depleted and labor and energy costs increase. As stated above, recovery of sodium carbonate (usually expressed as tons of sodium carbonate produced per ton of trona ore) has fallen as the higher quality reserves have been mined. Furthermore, the costs of developing new reserves requires substantial capital investment, as much as $100–150 million in 1995 dollars.

Recognizing the limitations of conventional mining techniques, various solution mining techniques have been proposed. Solution mining allows the recovery of sodium carbonate from trona deposits without the need for sinking costly mining shafts and employing workers in the mines. In its simplest form, solution mining comprises injecting water (or an aqueous solution) into a deposit of soluble ore, allowing the solution to dissolve as much ore as possible, pumping the solution to the surface, and recovering the dissolved ore from the solution.

For example, a solution mining technique was proposed in U.S. Pat. No. 2,388,009 to Pike on Oct. 30, 1945. Pike discloses a method of producing soda ash from underground trona deposits in Wyoming by injecting a heated brine containing substantially more carbonate than bicarbonate which is unsaturated with respect to the trona, withdrawing the solution from the formation, removing organic matter from the solution with an adsorbent, separating the solution from the adsorbent, crystallizing and recovering sodium sesquicarbonate from the solution, calcining the sesquicarbonate to produce soda ash, and re-injecting the mother liquor from the crystallizing step into the formation.

A second patent to Pike, U.S. Pat. No. 2,625,384, discloses another solution mining method which uses water as a solvent under ambient temperatures to extract trona from existing mined sections of the trona deposits. The subsequent solution is recovered from the mine and heated before dissolving additional dry mined trona in it, forming a carbonate liquor which can subsequently be processed into sodium carbonate.

As an additional complicating factor, however, sodium carbonate and sodium bicarbonate have different solubilities and dissolving rates in water. These incongruent solubilities of sodium carbonate and sodium bicarbonate can cause bicarbonate "blinding" when employing solution mining techniques. Blinding can slow dissolution and may result in leaving behind significant amounts of reserves in the mine. Blinding occurs as the bicarbonate, which has dissolved in the mining solution, tends to redeposit out of the solution onto the exposed surface of the ore as the carbonate saturation in the solution increases, thus "blinding" this surface—and its carbonate values—from further dissolution and recovery.

U.S. Pat. No. 3,184,287 to Gancy discloses a method for preventing bicarbonate blinding in the mine by using an aqueous solution of an alkali, such as sodium hydroxide having a pH greater than sodium carbonate, as a solvent for solution mining. U.S. Pat. No. 3,953,073 to Kube and U.S. Pat. No. 4,401,635 to Frint also disclose solution mining methods using a solvent containing sodium hydroxide. U.S. Pat. No. 5,043,149 discloses a process for disposing of insoluble tailings that remain when solubilizing uncalcined or calcined trona in the process of producing soda ash in which the tailings are slurried with water or waste solutions of sodium carbonate or sodium bicarbonate or both, injected into an underground mined out cavity and removing a liquor from the cavity whose concentration of sodium carbonate or sodium bicarbonate or both has been increased and from which sodium-based chemicals may be recovered.

A significant problem associated with solution mining is the subsequent recovery of the sodium carbonate from the relatively low concentration of carbonate and bicarbonate in the solution mine brine. In addition, the solution mining techniques disclosed above produce brines containing sufficient sodium bicarbonate and other impurities to prevent processing into sodium carbonate by the conventional monohydrate process. A major problem is the co-precipitation of sodium sesquicarbonate crystals during sodium carbonate monohydrate crystallization which reduces the quality of the final product.

It is well known to those skilled in the art that sodium bicarbonate can be converted to sodium carbonate by heating the sodium bicarbonate to a sufficiently high temperature. For example, U.S. Pat. No. 2,133,455 issued to Keene et al. discloses a method of converting a solution of sodium bicarbonate to sodium carbonate by stripping the sodium bicarbonate solution in a tower with steam having a temperature above 100° C. The resulting carbonate solution is then mixed in an evaporator with a saturated solution of sodium carbonate containing some dissolved sodium chloride.

U.S. Pat. No. 3,113,834 to Beecher et al. discloses a process for producing dense soda ash which includes the steps of decomposing a sodium bicarbonate solution by heating it to its boiling point while it is under pressure in excess of atmospheric. Beecher et al. discloses temperatures for decomposing sodium bicarbonate solutions between 150° C. to about 250° C. at super atmospheric pressure. U.S. Pat. No. 3,451,767 to Saeman et al. also discloses a method of making dense soda ash by decomposing a sodium bicarbonate solution at 150° to 250° C. and at 80 to 500 psia (pounds per square inch absolute) to form water, carbon dioxide, and anhydrous sodium carbonate. According to the Saeman process, sodium bicarbonate is mixed with a recycle stream containing suspended sodium carbonate seed crystals, a step not disclosed in Beecher. Similarly, Fujita et al. discloses a process for preparing sodium carbonate anhydride by countercurrent contacting of high pressure steam and a suspension of sodium bicarbonate or sodium sesquicarbonate in a concentrated solution of sodium carbonate at temperatures above 150° C.

Miller, in U.S. Pat. No. 3,264,057, discloses a process for producing soda ash crystals by leaching carbonate values from crude trona and decomposing the major part of sodium bicarbonate in the resulting solution by steam stripping at about 110° C. Miller also discloses in U.S. Pat. No. 3,246,962 a method for obtaining concentrated solutions of sodium carbonate and sodium bicarbonate from crude mined trona by leaching the alkali values from crude trona in a column while passing steam into the column.

Copenhafer et al. discloses in U.S. Pat. No. 5,283,054 a method for producing soda ash from a brine solution containing sodium carbonate and sodium bicarbonate by heating the brine to about 100° C. to about 140° C. to evaporate water, convert sodium bicarbonate to sodium carbonate, and to drive off resulting carbon dioxide and reacting the brine with reduced sodium bicarbonate with an aqueous sodium hydroxide solution in amounts to convert essentially all of the remaining sodium bicarbonate in the brine to sodium carbonate. The resulting sodium carbonate solution is further processed to recover soda ash.

Frint and Copenhafer, in U.S. Pat. No. 5,262,134, disclose a process for producing soda ash from a brine solution containing sodium carbonate and sodium bicarbonate by heating the brine to between 90° C. and 115° C. to evaporate water, convert sodium bicarbonate to sodium carbonate, and to drive off the resulting carbon dioxide therefrom until the concentration of sodium carbonate and sodium bicarbonate in the brine form a solution that will crystallize sodium sesquicarbonate. The resulting solution is then processed into various sodium based chemicals including sodium carbonate.

All of these disclosed processes require steam and temperatures of at least 90° C. Because the production of steam is expensive, a process which avoids the need to use steam or can make use of steam already available would allow the recovery of sodium carbonate chemicals from solution mining in an economical fashion without off-setting the costs saved through solution mining by higher energy costs in connection with processing the solution mine brine into soda ash or other sodium based chemicals. A process not requiring the generation of additional steam, other than is normally generated for the production of sodium based chemicals, would further reduce energy costs. Also, many of the prior art processes, particularly those being commercially developed, require the use of substantial quantities of expensive neutralizing agents such as caustic soda and lime. A process which eliminates or reduces the need for these reagents would greatly reduce production costs.

OBJECT AND SUMMARY OF THE INVENTION

It is thus an object of the present invention to provide an efficient and commercially viable method for recovering sodium carbonate and other valuable sodium based chemicals from naturally occurring mineral deposits containing sodium bicarbonate.

It is another object of the present invention to reduce the energy requirements and costs for processing sodium bicarbonate containing solutions obtained from mineral deposits into valuable sodium based chemicals.

The present invention meets these and other objectives by contacting an aqueous brine containing sodium bicarbonate with a gas that has a temperature of below about 90° C. and that is predominantly other than carbon dioxide for a time adequate to cause a sufficient amount of carbon dioxide to leave the aqueous solution to substantially reduce the amount of bicarbonate ion in the solution by converting the bicarbonate to carbonate as the carbon dioxide leaves the solution, and thereafter converting the remaining solution to other sodium salts.

Another aspect of the present invention is a method of producing sodium salts from aqueous brines containing sodium bicarbonate by contacting said aqueous brine with a gas that is predominantly other than carbon dioxide in an amount and for a time adequate to cause a sufficient amount of carbon dioxide to leave the aqueous solution to reduce the ratio of the concentration of sodium bicarbonate alkalinity to concentration of total alkalinity in the solution to less than 0.09, and thereafter converting the remaining solution to other sodium salts.

DETAILED DESCRIPTION OF THE INVENTION

Figure 1:
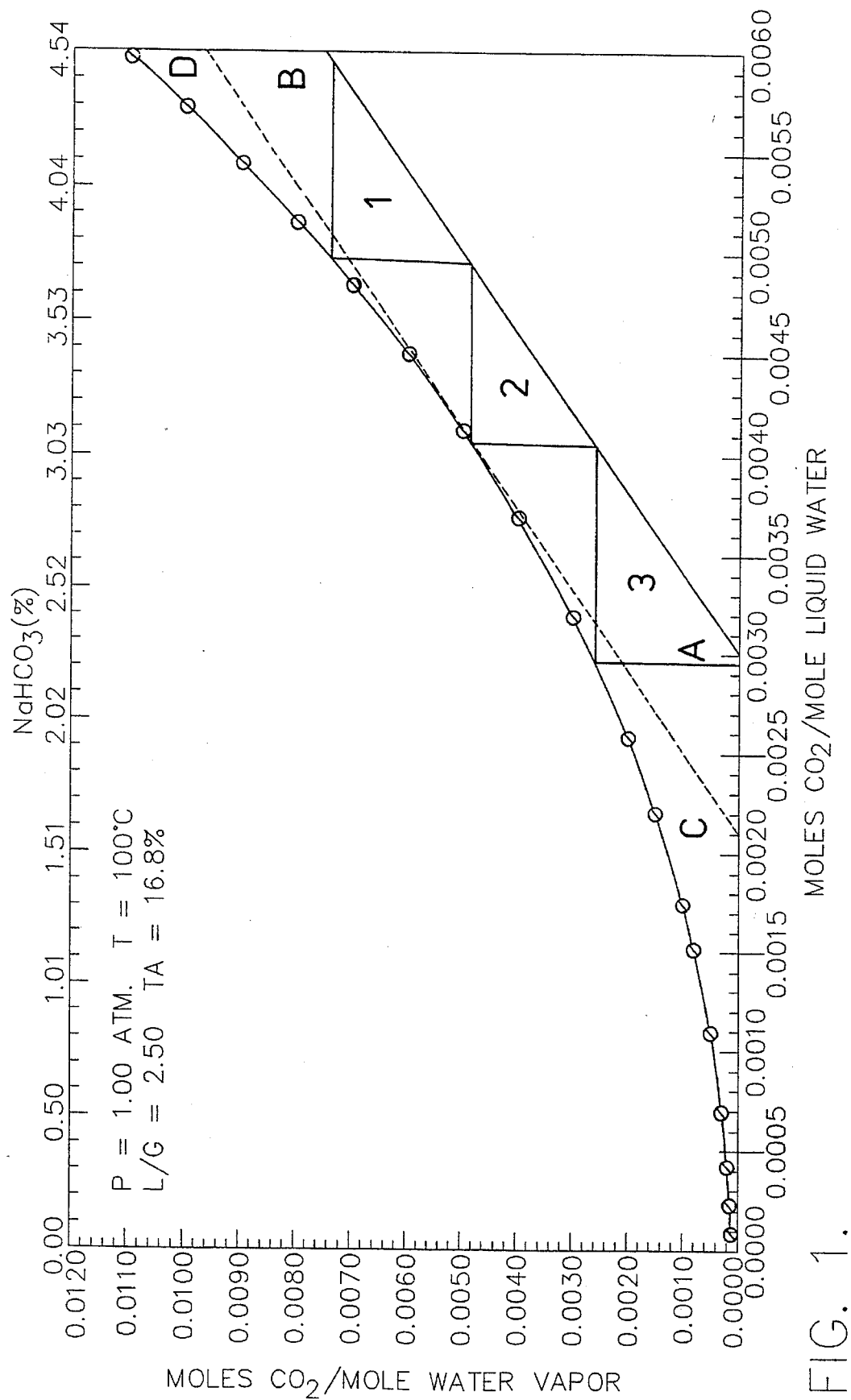
FIG. 1 is a graph depicting a method used to calculate the number of theoretical stages of a stripper operating at 100° C. needed to achieve an approximate 50 percent conversion of bicarbonate to carbonate at an L/G ratio of 2.50.

The present invention will be described more fully hereinafter with reference to the accompanying drawings in which preferred processes of the invention are shown. This invention can, however, be practiced in combination with various processes and should not be construed as limited to the processes set forth herein. Rather, these processes are provided so that this disclosure will be thorough and complete and will fully convey the scope of the invention to those skilled in the art.

The present invention is based on the recognition that the decomposition of bicarbonate in solution is neither primarily nor solely a thermal decomposition, but instead is based on solution equilibria which exist at any temperature. While the solubility of carbonate and bicarbonate is strongly dependent on solution temperature, the equilibrium between carbonate and bicarbonate is not. Thus, bicarbonate decomposition in solution can occur under relatively low temperature conditions and using gases such as steam, air or any other gas which does not react with an aqueous solution containing sodium bicarbonate. Previously, as reflected by the patents cited above, those skilled in the art believed that heat or high temperatures were necessary to decompose bicarbonate into carbonate.

The present invention is a method of reducing the bicarbonate content of an aqueous solution containing sodium bicarbonate comprising contacting the aqueous solution containing sodium bicarbonate with a gas that has a temperature of below about 90° C. and that is predominately other than carbon dioxide for a time adequate to cause a sufficient amount of carbon dioxide to leave the aqueous solution to reduce the amount of bicarbonate ion in the solution by converting the bicarbonate to carbonate as the carbon dioxide leaves the solution.

The present invention is also a method of producing sodium-containing salts from sodium bicarbonate-containing compositions, which include trona, nahcolite, and solutions containing sodium bicarbonate in a generally energy-efficient manner, the method comprising contacting an aqueous solution containing sodium bicarbonate, with a gas that has a temperature below about 90° C. and that is predominantly other than carbon dioxide for a time adequate to cause a sufficient amount of carbon dioxide to leave the aqueous solution to reduce the amount of bicarbonate ion in the solution by converting bicarbonate to carbonate as the carbon dioxide leaves the solution, and thereafter converting the remaining solution to other sodium salts. Furthermore, the invention involves contacting the aqueous solution with relatively large volumetric flow rates of gas, resulting in low liquid to gas ratios (L/G) as discussed further hereinafter, at the prescribed temperatures to increase overall bicarbonate decomposition so that the ratio of the concentration of sodium bicarbonate alkalinity to concentration of total alkalinity of the solution is less than 0.09.

In addition, the present invention provides a method of producing sodium-containing salts from sodium bicarbonate containing compositions by contacting an aqueous solution of a sodium bicarbonate-containing composition with a gas that is predominately other than carbon dioxide in an amount and for a time adequate to cause a sufficient amount of carbon dioxide to leave the aqueous solution to substantially reduce the amount of sodium bicarbonate in the solution so that the ratio of bicarbonate alkalinity to solution total alkalinity is less than about 0.09 by converting the bicarbonate to carbonate as the carbon dioxide leaves the solution and thereafter converting the remaining solution to sodium salts.

The aqueous solution containing sodium bicarbonate may be obtained by forming the aqueous solution (also referred to as mine water) from trona, nahcolite or from some other bicarbonate containing mineral by exposing it to water or an aqueous solution of sodium carbonate and sodium bicarbonate or an aqueous solution of sodium hydroxide and sodium carbonate. A preferred solvent for forming an aqueous solution is an aqueous solution containing between about 0 and 15 weight percent sodium carbonate and between about 0 and 3 weight percent sodium bicarbonate. A solvent solution containing between about 0 and 8 weight percent sodium hydroxide and between about 0 and 15 weight percent sodium carbonate may also be used. Aqueous solutions containing bicarbonate which are formed during the processing of sodium carbonate or sodium bicarbonate or which may naturally occur may be used according to the present invention in lieu of forming an aqueous solution from a bicarbonate-containing composition such as a mineral deposit of trona, nahcolite, or wegscheiderite.

In preferred embodiments, the step of "contacting an aqueous solution with a gas" comprises contacting the aqueous solution with a gas (vapor) in a packed or tray tower (mass transfer unit) also referred to as a "stripper." Generally, the liquid and gas are contacted countercurrently. The design and operation of such equipment is generally well-known in the art and can be utilized without undue experimentation.

Steam is the preferred gas when maximum conversion of bicarbonate is desired. Because steam is not consumed in the stripping process, steam designated for other uses can be used as the stripping gas. A multiple effect evaporator or crystallizer train, such as those commonly employed to form sodium carbonate monohydrate or for caustic production, provide ideal sources of steam for the stripper and have steam temperatures ranging from about 40° C. to about 130° C. Thus, steam from at least one evaporator or crystallizer of a multiple effect evaporator or crystallizer train may be used. Steam from the final evaporator or crystallizer effect, which operates from about 40° C. to 70° C., has the advantage of not requiring any compression or additional steam to make up for pressure drop since it is waste steam destined to be condensed anyway. Waste steam from a nearby power plant, including a cogenerating power plant, producing electricity may also be used. Air may also be used as the stripping gas, although evaporation of water may require additional heat input. Moist or humid warm air is thus preferred.

The aqueous solution or mine water containing bicarbonate may be preheated before being fed to the stripper to minimize energy requirements and avoid condensation of steam in the tower. The stripping unit is preferably operated at or near the temperature of available steam. The aqueous solution feeding the stripper may have a total alkalinity of up to about 32 weight percent and may be saturated with respect to sodium bicarbonate. It may also be treated to remove impurities which could interfere with the remaining processing steps. Such treatment includes filtering to remove insoluble impurities such as silicates. After reducing the bicarbonate concentration in the aqueous solution by stripping the remaining solution containing carbonate and some remaining bicarbonate can be further processed to yield sodium based salts including anhydrous sodium carbonate (soda ash).

When a stripper is used as the gas contact device, the extent of the conversion of bicarbonate depends primarily upon the temperature, the pressure, the liquid to gas (L/G) ratio in the stripper, and the number of stages in the stripper. Evaporation of water from the solution is not necessary to aid in the conversion of bicarbonate to carbonate and when the aqueous solution feed temperature is about that of the saturated steam or other gas being fed to the stripper, significant evaporation of water from the aqueous solution will not occur. If the stripping operation does not lower the bicarbonate content to the desired level for the chosen process as discussed hereinafter, additional decomposition of bicarbonate can be achieved by adding a basic or neutralizing composition such as sodium hydroxide, calcium hydroxide, or calcium oxide (lime).

To prepare anhydrous sodium carbonate, the remaining solution leaving the stripper can be fed to an evaporator where the solution is concentrated. Caustic or lime may then be added to the evaporator, if needed, to convert any remaining bicarbonate to carbonate and to avoid sesquicarbonate precipitation in the evaporator. The need for the addition of caustic or lime will depend on the temperature, mass flow rate of the aqueous solution to the stripper, the mass flow rate of the steam or other gas to the stripper, and the size and design of the stripper. The carbonate solution leaving the evaporator can be fed directly to a monohydrate process, combined with conventionally prepared monohydrate feed liquor, or submitted to further purification steps such as filtering, carbon treating, or decahydrate crystallization, if necessary. These steps are well understood by those skilled in the art.

Alternatively, the remaining solution leaving the stripper may be mixed with calcined trona ore to produce a nearly saturated sodium carbonate liquor. As discussed above, caustic or lime addition may be required to convert all or a portion of the bicarbonate remaining in the solution leaving the stripper to carbonate. After lime or caustic addition, the nearly saturated stream containing essentially sodium carbonate can be fed directly to a monohydrate process, or submitted to further purification steps, if necessary.

To prepare caustic soda, the carbonate and remaining bicarbonate solution leaving the stripper can be fed directly to a causticization unit where the solution is reacted with calcium oxide (lime) or calcium hydroxide to form sodium hydroxide which is then purified by filtering or other means. The filtered sodium hydroxide solution is then usually concentrated to a 50 percent sodium hydroxide solution by heating in a multiple effect evaporator train.

One advantage of the present invention used in connection with the processes described herein is that the maximum conversion of bicarbonate to carbonate possible at a fixed L/G ratio (ratio of the mass flow rate of the liquid solution feeding the stripper in moles of water per hour divided by the flow rate of the gas entering the stripper in moles per hour) is increased with decreasing temperature (reduced pressure), if steam is the stripping gas. Another advantage to the present invention is that the aqueous solution entering the stripper can be fed at temperatures below 90° C. to reduce energy costs. By using saturated steam having a temperature below about 90° C., as well as the steam having a temperature above about 90° C. which is available from a monohydrate or caustic multiple effect evaporator train, L/G ratios can actually be lowered, resulting in improved conversion of bicarbonate to carbonate so that the ratio of the sodium bicarbonate alkalinity (expressed as carbonate) to total alkalinity is less than 0.09. In addition, energy costs are reduced by using already available steam. Of particular benefit is the ability to use existing steam, generated in multiple-effect crystallizer and evaporator systems of existing monohydrate and caustic plants, in the stripper or strippers to convert bicarbonate to carbonate. If necessary, vapor recompression or make-up steam can be added to restore any pressure drop or heat loss which occurs in the stripper or strippers.

In a preferred mode of stripping according to the present invention, steam at a temperature of about 40° C. to 90° C. and at a pressure of about one psia to 10 psia (subatmospheric) is used in a stripping column to remove $CO_2$, thus converting sodium bicarbonate to sodium carbonate.

The feed solutions to such stripping columns may be saturated with respect to bicarbonate species at the temperature of column operation. Typical solution concentrations may be from about 2 percent to saturation for sodium bicarbonate and from about 0 percent to about 30 percent for the sodium carbonate. The temperature of the feed solution is preferably at the column operation temperature.

While L/G ratios may vary depending on various factors, preferred L/G ratios for steam at about 40° C. to about 90° C. are from about 0.2 to about 20 when the aqueous solution has a total alkalinity of from about 5 percent to about 25 percent. A column with 1 to 60 theoretical stages is preferred for stripping operations.

Figure 5:
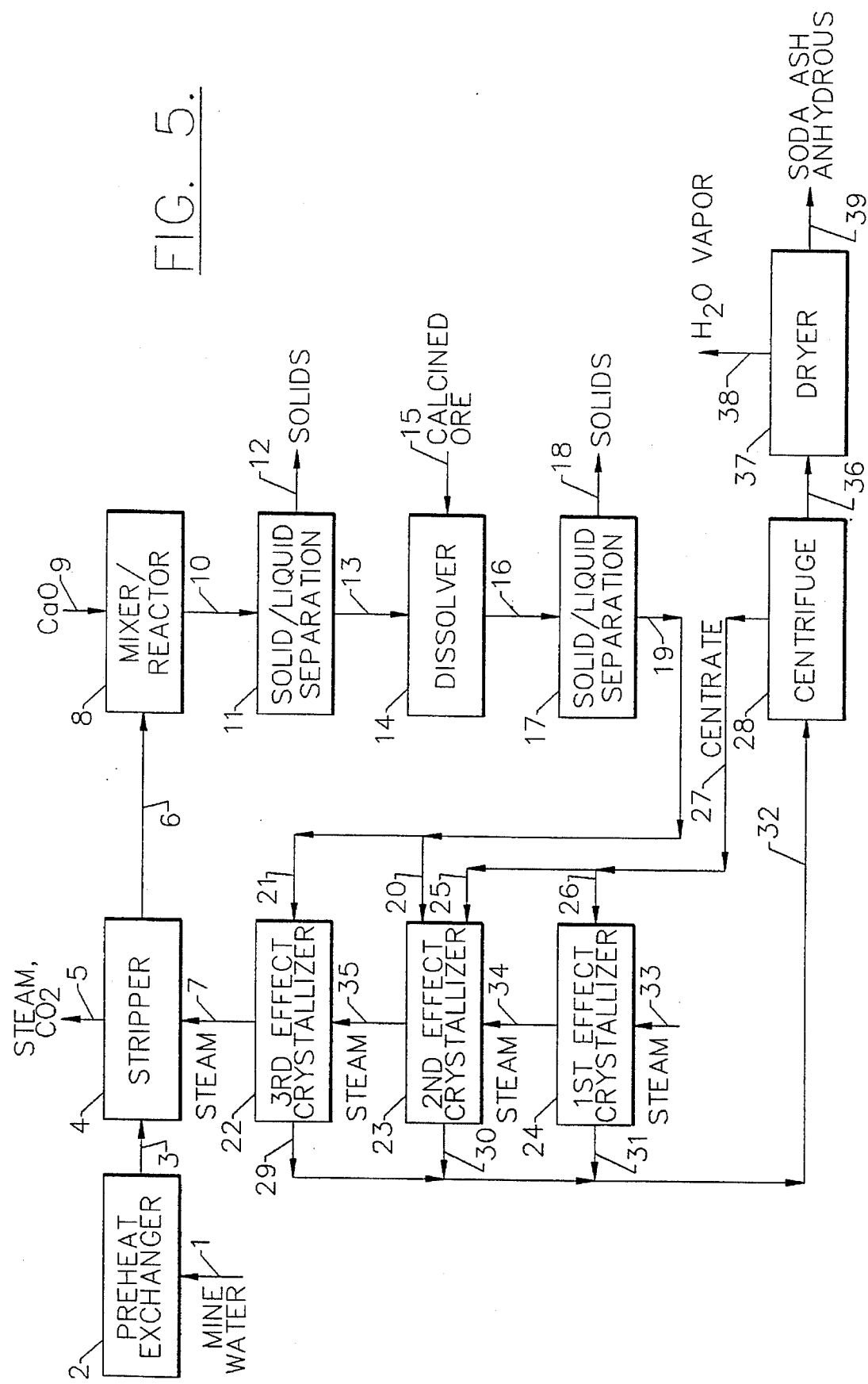
FIG. 5 is a flow diagram showing a process according to the invention wherein soda ash is produced.

FIG. 5 is a schematic diagram which represents a preferred mode of carrying out the present invention to produce soda ash. The aqueous solution containing sodium bicarbonate is fed to a stripper wherein the aqueous solution is contacted countercurrently with steam at about 55° C. to about 70° C. at a pressure of about 2 psia to about 4.5 psia. The steam removes carbon dioxide from the aqueous solution. Removal of the carbon dioxide drives the decomposition of the bicarbonate to carbonate. This decomposition process is understood by reference to carbonate chemistry as demonstrated below.

In this discussion, concentrations of the various chemical species ($H^+$, $HCO_3^-$, $CO_3^{2-}$ $OH^-$, $Na^+$) present in solution throughout the process will be used for simplicity, although it is understood that detailed calculations require the use of activities for each chemical species. The activity of a species or component of a solution is the product of the concentration of a component of a solution and its activity coefficient. The activity coefficient for a particular component is the value necessary to correct for deviation of that component from an ideal solution.

Carbonate chemistry can be described in terms of the reactions which occur when carbon dioxide ($CO_2$) dissolves in water. A simplified version of the reaction is given below in equation (1). Actually, most of the $CO_2$ in solution exists as dissolved $CO_2$ and not as $H_2CO_3$ as shown below, but this does not affect the chemistry and reaction (1) is conceptually simple. This reaction is often mass transfer limited and therefore appears slow.

$$CO_2 + H_2O \rightleftharpoons H_2CO_3 \tag{1}$$

The concentration of $H_2CO_3$ in solution is related to the partial pressure of $CO_2$ above the solution ($P_{CO2}$) by equation (2) where $K_H$ is the Henry's Law constant.

$$[H_2CO_3] = K_H P_{CO2} \tag{2}$$

Carbonic acid ionizes in water via reaction (2). This reaction is essentially instantaneous.

$$H_2CO_3 \rightleftharpoons HCO_3^- + H^+ \tag{3}$$

The concentration of the various species are related by equation (4) where $K_{a1}$ is the first acidity constant of carbonic acid.

$$[HCO_3^-][H^+] = K_{a1}[H_2CO_3] \tag{4}$$

The bicarbonate ion also ionizes via reaction (5). This reaction is similarly essentially instantaneous.

$$HCO_3^- = CO_3^{2-} + H^+ \tag{5}$$

Thus, the concentration of the various species are also related by equation (6) where $K_{a2}$ is the second acidity constant of carbonic acid.

$$[CO_3^{2-}][H^+] = K_{a2}[HCO_3^-] \tag{6}$$

The expression for $[H_2CO_3]$ found in equation (2) can be substituted in equation (4), and the result rearranged to yield equation (7). Equation (7) demonstrates that the bicarbonate concentration depends on pH and $CO_2$ partial pressure.

$$[HCO_3^-] = \frac{K_{a1} K_H P_{CO_2}}{[H^+]} \tag{7}$$

The expression for $[HCO_3^-]$ found in equation (7) can be substituted in equation (6), and the result rearranged to yield equation (8), which likewise demonstrates the dependance of the carbonate concentration on pH and $CO_2$ partial pressure.

$$[CO_3^{2-}] = \frac{K_{a2} K_{a1} K_H P_{CO_2}}{[H^+]^2} \tag{8}$$

Another fundamental relationship in such a system is the ionization of water, as shown in equation (9).

$$H_2O \rightleftharpoons H^+ + OH^- \tag{9}$$

The concentration of the various species is related by equation 10, where $K_w$ is the water ionization constant.

$$K_w = [H^+][OH^-] \tag{10}$$

Standing alone, however, equations (2), (7), and (8) are not adequate to determine the equilibrium conditions for a solution containing sodium carbonate and sodium bicarbonate. To fully determine the equilibrium conditions, an additional set of relationships must be considered; i.e., the charge balance of the solution. The charge balance for a solution containing sodium carbonate and sodium bicarbonate is shown in equation (11).

$$[H^+] + [Na^+] = [HCO_3^-] + 2[CO_3^{2-}] + [OH^-] \tag{11}$$

By assuming that $[H^+] \ll [Na^+]$, and substituting the appropriate expressions from equations (7), (8), and (10) into equation (11), and then rearranging, equation (12) can be obtained.

$$[Na^+][H^+]^2 - (K_{a1} K_H P_{CO_2} + K_w)[H^+] - 2K_{a2} K_{a1} K_H P_{CO_2} = 0 \tag{12}$$

This equation is quadratic with respect to $[H^+]$. By substituting various values for the sodium ion concentration, and various partial pressures of carbon dioxide, the expected equilibrium pH values can be calculated. The $[H^+]$ calculated by this procedure can then be used to calculate the corresponding bicarbonate and carbonate concentrations using equations (4) and (6). This can be used to establish a table of equilibrium conditions such as the one shown in Table 1.

The data in Table 1, showing partial pressures of $CO_2$ for aqueous solutions containing certain concentrations (expressed in weight percent) of sodium carbonate and sodium bicarbonate, demonstrates that solution mining solution are not in equilibrium at atmospheric conditions, and that evolution of $CO_2$ is to be expected. The equilibrium values show that a large portion of the bicarbonate (~75 percent) could be decomposed by air at room temperature by removing $CO_2$ instead of heating the solution or adding a basic or neutralizing species. Use of a $CO_2$ free stripping gas such as steam, could decompose even more bicarbonate.

As stated before, activities should be used instead of concentrations in these calculations. The activity coefficients for the various species are somewhat uncertain at the concentrations found in solution mining solution. Accordingly, approximations were made to generate the values in Table 1, but the uncertainty in the values in Table 1 is not large enough to affect the conclusion that a large portion of the bicarbonate could be converted to carbonate by stripping with air at ambient temperatures.

TABLE 1

| $P_{CO_2}$ (mmHg) | percent $NaHCO_3$ | percent $Na_2CO_3$ |
| --- | --- | --- |
| 4.33 | 4.01 | 17.0 |
| 3.80 | 3.77 | 17.2 |
| 1.90 | 2.72 | 17.8 |
| 0.76 | 1.75 | 18.4 |
| 0.57 | 1.52 | 18.6 |
| 0.38 | 1.25 | 18.7 |
| 0.24* | 1.00 | 18.9 |
| 0.038 | 0.40 | 19.3 |

*partial pressure of $CO_2$ in air

Temperature will alter the values reported in Table 1. This occurs for several reasons. The most obvious is the dependance of $CO_2$ solubility on temperature. As the temperature is increased, $CO_2$ solubility decreases, favoring the decomposition of bicarbonate. In addition, temperature affects each of the equilibrium constants used to calculate the values in Table 1. Temperature will also alter the activities of the species in solution, again affecting the equilibrium concentrations. In general, increasing temperature will shift the equilibrium values towards lower bicarbonate concentrations for a given carbon dioxide partial pressure. This temperature effect apparently has been a principal consideration which led earlier developers to operate generally at temperatures above about 100° C.

The decomposition of bicarbonate consists of a series of chemical reactions. Increasing temperature will generally increase the rate of reactions, although in this case the reactions occur so quickly that the effect may be unimportant. In actual practice, the rate limiting step often is the mass transfer of $CO_2$ from the solution to the stripping gas. Increasing the temperature will tend to increase the mass transfer rates. This will reduce the size of the equipment required.

As noted above, the present invention is based on the recognition that the decomposition of bicarbonate in solution is not a thermal decomposition, as has been supposed in the past. It is based entirely on solution equilibria which exists at any temperature. This understanding allows one to consider bicarbonate decomposition in solution under conditions (lower temperature and air stripping, for example) which have not been considered in the past.

As is demonstrated by background chemistry, removal of $CO_2$ is the driving factor behind the conversion of bicarbonate to carbonate. Previously, those skilled in the art believed that heat was necessary to decompose bicarbonate into carbonate. Decomposition by heating is disclosed in several patents, including U.S. Pat. No. 2,133,455 to Keene et al., U.S. Pat. No. 3,113,834 to Beecher et al., U.S. Pat. No. 3,451,767 to Saeman et al., U.S. Pat. No. 3,264,057 to Miller, U.S. Pat. No. 5,283,054 to Copenhafer et al., and U.S. Pat. No. 5,262,134 to Frint et al., discussed above. Even Miller, who in U.S. Pat. No. 3,246,962 recognized the equilibrium nature of the reaction, continued to use high temperature steam.

In practice, the primary factors affecting the conversion of bicarbonate to carbonate are temperature, pressure, the size of the stripping tower, and the liquid to gas (L/G) ratio in the tower. These relationships are illustrated in FIGS. 1, 2, 3, and 4. These figures were constructed from the same equations used to generate Table 1. Therefore, some uncertainty exists regarding exact values, but the data points are reliable enough to illustrate the effects of temperature, pressure, L/G ratios, and column size.

Referring to FIG. 1, the line AB is the operating curve for a particular stripping column operating at 1.0 atmosphere and 100° C. using steam as the stripping gas. By definition, the line AB has a slope corresponding to the L/G for that column (L/G=2.50). The point A corresponds to the expected exit concentration of bicarbonate from the column ($NaHCO_3$=2.27 percent). By stepping down the line as shown, the number of theoretical stages for the column can be calculated. If this line is moved towards the vapor equilibrium curve without changing its slope, the number of theoretical stages will increase and the final bicarbonate concentration will decrease, that is to say, a column operating under the new conditions will be longer, but provide a greater conversion of bicarbonate to carbonate. A lower limit of bicarbonate concentration which can be achieved for a given L/G is reached when the line AB actually touches the vapor equilibrium curve. These conditions correspond to an infinitely long column and are represented by line CD. The minimum bicarbonate concentration which can be achieved for the conditions displayed in FIG. 1 at an L/G ratio of 2.5 is 1.60 percent $NaHCO_3$ corresponding to point C.

Figure 2:
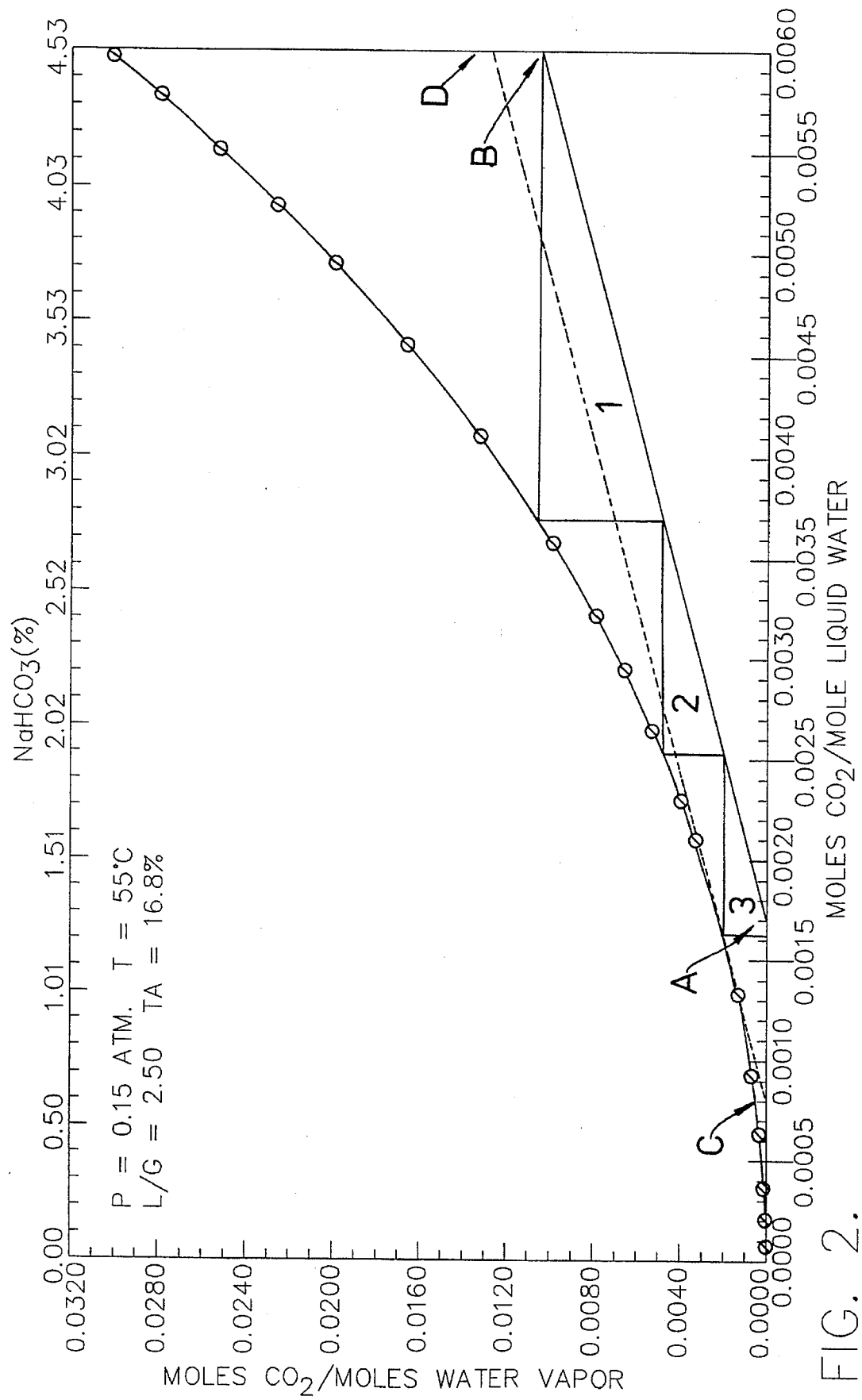
FIG. 2 is a graph depicting a method used to calculate the number of theoretical stages of a stripper operating at 55° C. needed to achieve an approximate 50 percent conversion of bicarbonate to carbonate at an L/G ratio of 2.50.

FIG. 2 presents the same information as FIG. 1 except the stripping column is operating at 55° C. and 0.15 atm. The line CD in FIG. 2 presents the operating conditions for an infinitely long column. The minimum bicarbonate concentration which can be achieved for the conditions displayed in FIG. 2 at an L/G ratio of 2.5 is 0.60 percent $NaHCO_3$ corresponding to point C. Clearly, lower bicarbonate values and higher conversions are possible at lower temperatures when using steam as the stripping gas. This occurs because the pressure in the column is less at the lower temperatures, resulting in a lower partial pressure of $CO_2$ for a fixed carbon dioxide to steam ratio. Conversely, the high temperatures proposed in the past have limited the conversion possible for a fixed L/G ratio. It should be recognized, however, that as the temperature decreases, more stages are needed, resulting in longer stripping columns, because of the decreasing efficiency of each stripping stage. It is noteworthy, however, that operation at lower pressure (subatmospheric) and lower temperature for a given column can give lower residual bicarbonate values reflecting higher conversion to sodium carbonate. Assuming a three stage column, operation under the conditions set forth in FIG. 2 gives a residual sodium bicarbonate concentration of about 1.20 percent, while at the conditions of FIG. 1 (higher pressure and temperature), an infinitely long column is required to yield a residual bicarbonate concentration of about 1.60 percent. A three stage column operated under the conditions of FIG. 1 gives a residual sodium bicarbonate value of about 2.0 percent. Thus, for a given number of theoretical stages, a column may be advantageously operated under the low temperature, low pressure conditions described by the present invention.

Figure 3:
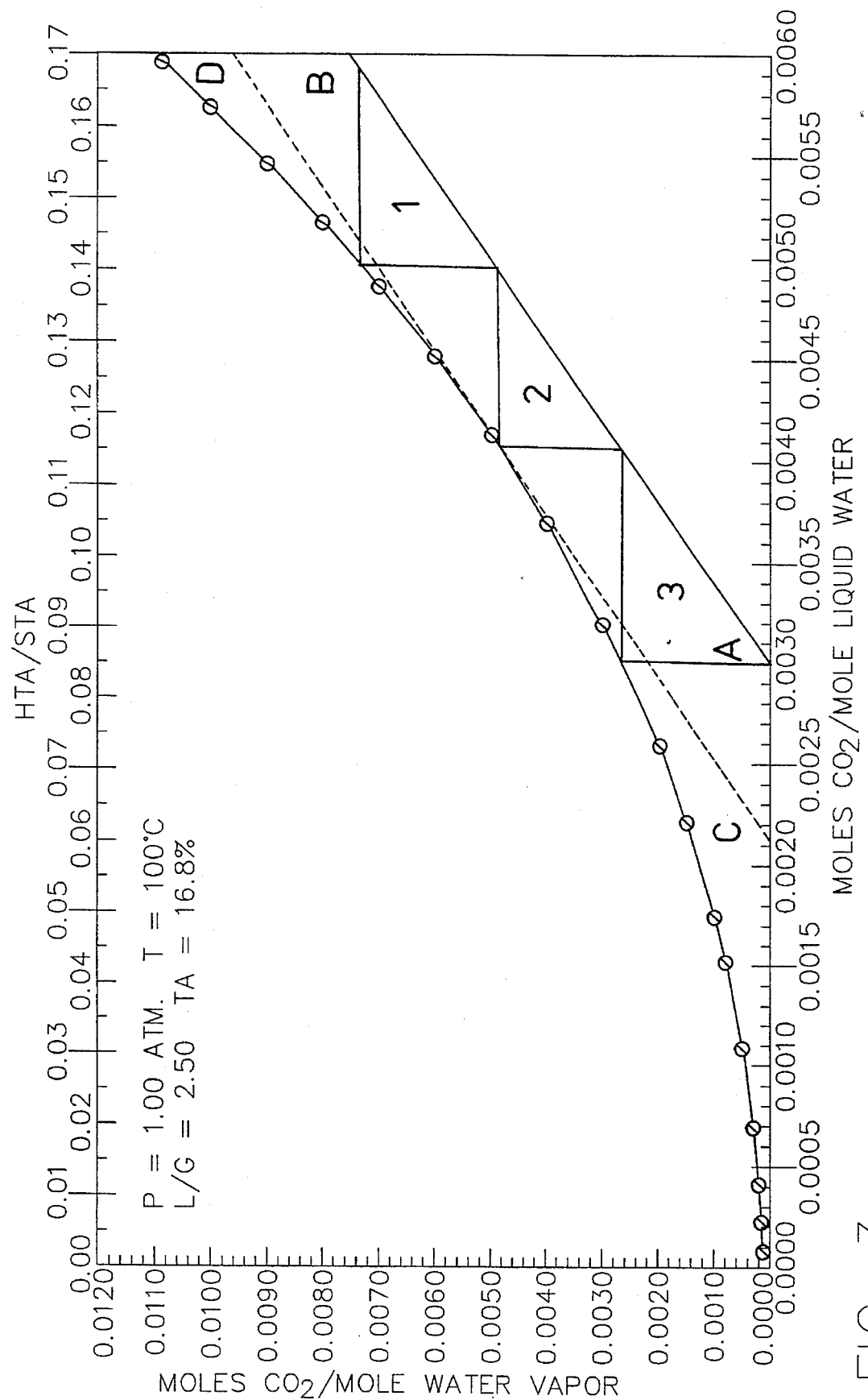
FIG. 3 is a graph which differs from FIG. 1 only in that the bicarbonate concentration is expressed as a ratio of bicarbonate alkalinity (HTA) to solution total alkalinity (STA).

FIG. 3 presents the same information as FIG. 1, but instead of showing the sodium bicarbonate concentration in weight percent at the top of the figure, as shown in FIG. 1, the HTA/STA ratio (bicarbonate alkalinity divided by solution total alkalinity) of the solution is shown. This figure represents a three stage (theoretical) stripping column operating at 10 atmosphere of pressure, 100° C., an L/G ratio of 2.50 and a feed solution having a TA (total alkalinity) of 16.8 percent. Point A shows that the solution exiting the stripper has an HTA/STA ratio of about 0.09.

Figure 4:
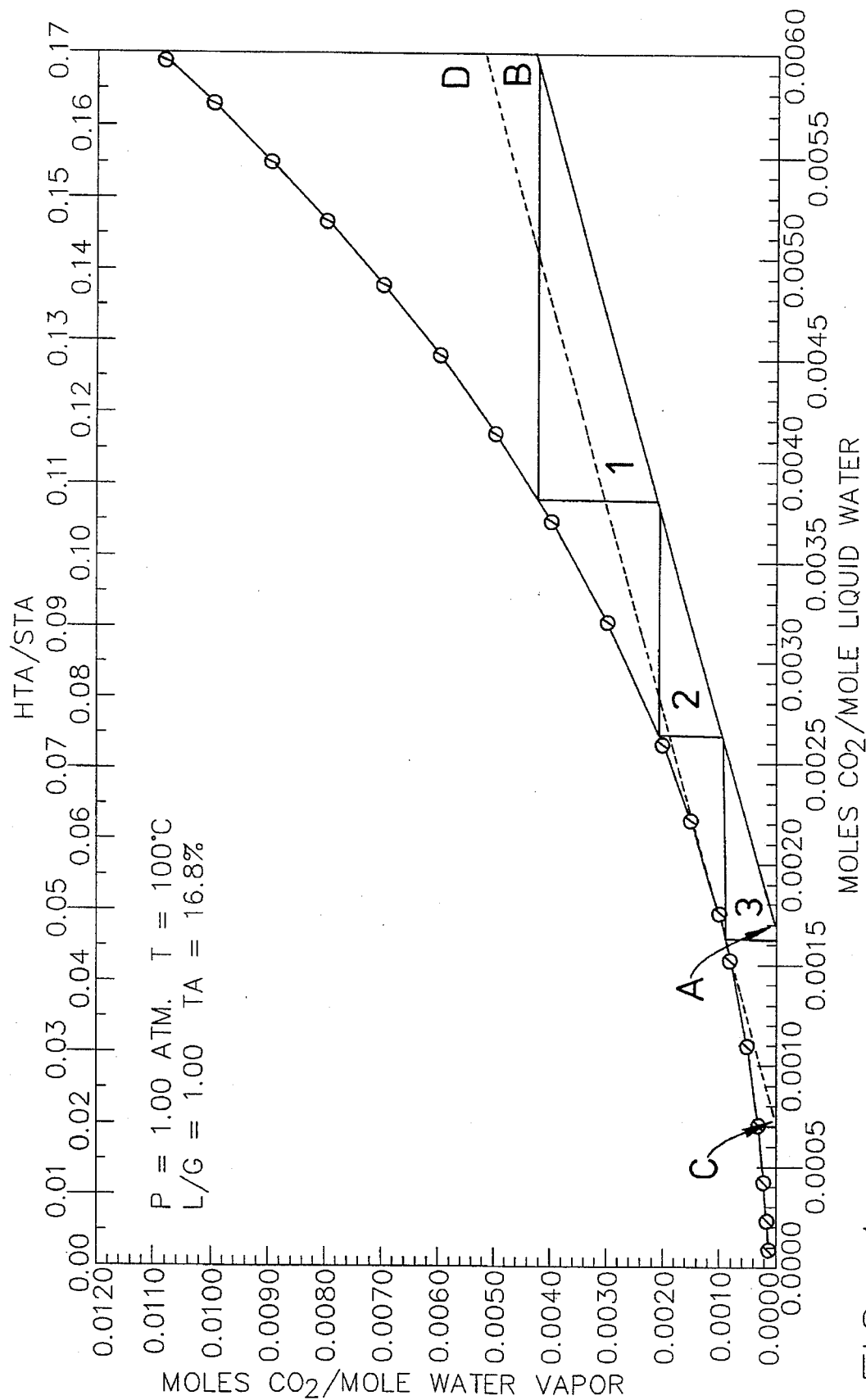
FIG. 4 is a graph depicting a method used to calculate the number of theoretical stages of a stripper operating at 100° C. needed to achieve an approximate 72 percent conversion of bicarbonate to carbonate at an L/G ratio of 1.00.

FIG. 4 presents the same information as FIG. 3, but with the stripping column operating with an L/G of 1.00. Line AB again represents a three stage (theoretical) stripping tower, but the HTA/STA of the solution exiting the bottom of the tower is now greatly reduced to an HTA/STA ratio of 0.048. Line CD again represents the conditions for an infinitely long column. Point C, representing the minimum HTA/STA possible for an L/G of 1.00, has a much lower value (HTA/STA=0.021) than that obtained in FIG. 3 with an L/G of 2.50 (HTA/STA=0.059).

The relatively low conversion of bicarbonate to carbonate using the stripping operations described in the prior art are caused by the high L/G ratios used. For example, U.S. Pat. No. 5,262,134 to Frint et al. discloses that when stripping solutions rich in bicarbonate, the lowest sodium bicarbonate alkalinity divided by the solution total alkalinity values to be expected for the column effluent are about 0.09 to 0.11. Because the solution being stripped is providing the steam for stripping, the process is restricted to fairly high L/G ratios (greater than 2), unless the feed stream is diluted. In this case, the evaporation steps become uneconomical. Similar limitations are seen in U.S. Pat. No. 5,283,054 which discloses that the maximum expected conversion of bicarbonate to carbonate is 50 percent. For the solution described, this corresponds to a sodium bicarbonate alkalinity divided by the solution total alkalinity value of about 0.09. Once again, L/G ratios greater than 2 are required to avoid excessive evaporation costs. In U.S. Pat. No. 3,264,057, Miller does not provide the composition of every stripped stream, but where information is supplied, HTA/STA ratios in stripped solutions range from 0.14 to 0.19. The data in the examples disclosed by Miller suggest L/G ratios between 2.5 and 3.5. The patent issued to Keene, et al. U.S. Pat. No. 2,133,455, discloses that by starting with a pure sodium bicarbonate slurry, a greater than 85 percent conversion of bicarbonate can be achieved by stripping. However, the stripping column effluent in Keene's process still had an HTA/STA of 0.14. In all cases, prior patents disclose limited conversion of bicarbonate to carbonate by stripping; with an HTA/STA of about 0.09 representing the best conversion expected.

An aspect of the present invention is that decreasing the L/G ratio allows a higher ultimate conversion of bicarbonate to carbonate at any temperature. In fact, with a low enough L/G, and a long enough column, complete conversion of bicarbonate to carbonate can be expected. Therefore, in actual practice, a balance will be obtained between the availability and cost of steam (affecting L/G ratios), capital costs for stripping equipment, and the costs to handle any remaining bicarbonate. Steam generated from existing evaporators or crystallizers used in soda ash and sodium hydroxide production may be used to economically operate the strippers at low L/G ratios.

A significant aspect of the instant invention is that large volumes of waste steam are available from the final stage of a multiple stage evaporator in a conventional sodium carbonate plant. Thus, plentiful steam is available for sourcing a low L/G ratio which is, conversely, a high G/L ratio. This steam, even though having a large energy content, exists in a degraded state (subatmospheric pressure and low temperature). However, as demonstrated by the instant invention, significant advantages accrue by operation of a stripping column with low L/G ratios, low temperature and low pressure. Depending upon the particular process used, L/G ratios may range from about 0.2 to about 20. The steam exiting from the final stage of a multiple effect evaporator is otherwise generally exhausted.

Figure 6:
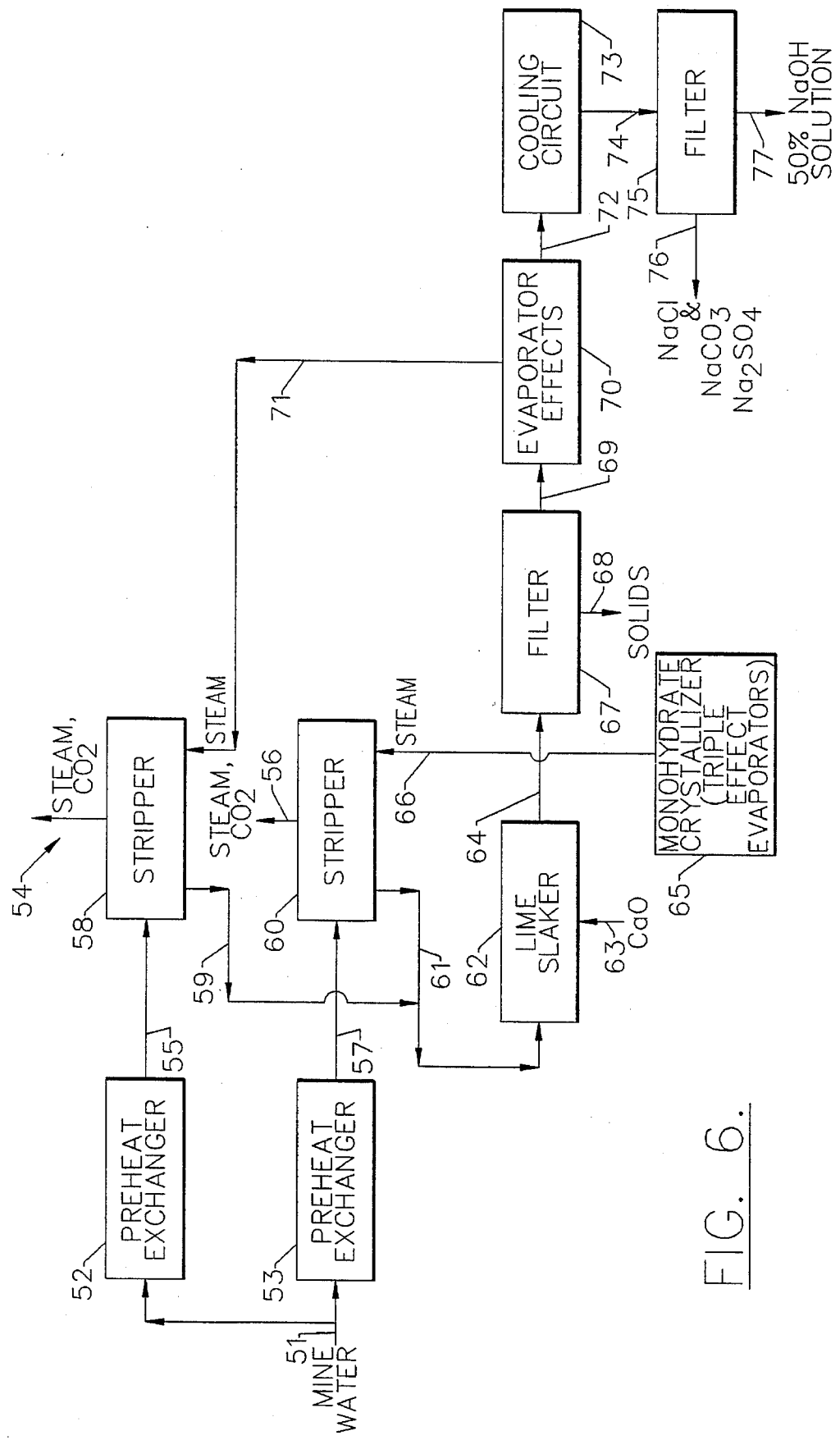
FIG. 6 is a flow diagram showing a process according to the invention wherein sodium hydroxide solution is produced.

Returning to FIG. 5, mine water or other solution 1 containing between about 0 percent and 25 percent sodium carbonate and containing sodium bicarbonate concentrations from about 2 percent to saturation, along with other impurities is fed to a preheat exchanger 2 where it is heated to approximately the operating temperature of the stripper and fed via stream 3 to the stripper 4. The mine water 1 may be filtered prior to being fed to the preheat exchanger 2 to remove unwanted solids such as silicates. The stripper 4 is a packed or tray tower design. More than one stripper may be employed, either in parallel, as shown in FIG. 6, (so that the mine water flow is split into two or more streams which are fed to each stripper) or in series. Steam and carbon dioxide are removed from the stripper 4 via stream 5 and may be used as the heating medium in the preheat exchanger 2. Preferably, the source of the steam 7 to the stripper 4 is from the third effect 22 of a triple effect evaporative crystallizer train as shown. Calcium oxide 9 is added to the stripped liquor 6, (the remaining solution containing carbonate and remaining bicarbonate,) in a mixer/reactor 8. Sodium hydroxide or calcium hydroxide may be substituted for calcium oxide. If sodium hydroxide is used, the solid/liquid separation unit 11 is not required. The calcium oxide 9 converts the remaining bicarbonate to carbonate in order to avoid sodium sesquicarbonate precipitation in later steps. The solution 10 leaving the mixer/reactor 8 contains sodium carbonate and is essentially free of sodium bicarbonate. Up to about 0.3 weight percent sodium bicarbonate can be tolerated in solution 10 leaving mixer/reactor 8. The carbonate solution 10 is fed to a solid/liquid separation unit 11 where calcium carbonate 12 is removed. The carbonate solution 13 which is now essentially free of solids is next fed to a dissolver 14 where calcined ore 15 is added so that the carbonate content in the solution 16 leaving the dissolver 14 is increased to any level desired and preferably up to about 28 to 32 weight percent sodium carbonate. Solids 18 generated from the addition of calcined ore 15 are removed by solid/liquid separation 17. Those familiar with the art will understand how the lime and calcined ore addition can be accomplished in an existing counter-current dissolving circuit (CCD) typically used in soda ash production. The concentrated sodium carbonate solution 19 which is essentially free of solids is fed to the second effect 23 and third effect evaporative crystallizers 22. Sodium carbonate monohydrate crystals are formed in the crystallizers and a slurry containing the crystals leaves the second and third effect via streams 30 and 29 which are combined with monohydrate crystals leaving the first effect 24 via stream 31. Streams 29, 30, and 31 may be combined into one stream 32 and fed to a centrifuge 28. The crystals are separated from the slurry and sent via stream 36 to a dryer 37 where water vapor 38 is removed yielding anhydrous sodium carbonate (soda ash) which exits the dryer via stream 39. The centrate 27 leaving the centrifuge 28 is fed to the first effect crystallizer 24 and second effect crystallizer 23. Steam 33 is fed to the first effect crystallizer 24 which operates at about 106° C. Steam 34 generated in the first effect crystallizer 24 is used to heat the second effect crystallizer 23 which operates at about 80° C. to about 90° C. The steam 35 generated in the second effect crystallizer 23 is used to heat the third effect crystallizer 22 which operates at about 60° C. to about 75° C. The steam generated in the third effect crystallizer 22 is fed via stream 7 to the stripper 4. Alternatively, steam 35 leaving the second effect crystallizer 23 may be fed to the stripper 4, and then the steam leaving the stripper 4 via stream may be fed to the third effect crystallizer 22. Steam 7 leaving the third effect crystallizer 22 can then be fed to the preheat exchanger 2.

A second embodiment of the invention is depicted schematically in FIG. 6. As described in FIG. 5, the mine water 51 flow is split and fed to two preheat exchangers 52 and 53, and then fed via streams 55 and 57 to the strippers 58 and 60 at about the operating temperature of the strippers where it is contacted with steam 66 and 71 at about 55° C. to about 70° C. to remove carbon dioxide via streams 54 and 56. Because the temperature of the mine water entering the strippers 58 and 60 is about the same temperature as the steam 66 and 71 entering the strippers, little condensation or evaporation occurs in the strippers and most of the steam 66 and 71 entering the strippers leaves via streams 54 and 56. Preferably the source of the steam 66 and 71 feeding the strippers 58 and 60 is the vapor from the third effect of a triple effect sodium carbonate monohydrate crystallizer system 65 or steam from the fourth effect of a four effect evaporator train 70 of a caustic plant, or both.

The mine water 51 may be filtered prior to being fed to the preheat exchangers 52 and 53 to remove unwanted solids such as silicates. The strippers 58 and 60 are of a packed or tray tower design. The stripped liquors 59 and 61 are fed to a lime slaker 62 where calcium oxide 63 is added to convert the sodium carbonate and remaining sodium bicarbonate in streams 59 and 61 into sodium hydroxide. Stream 64 leaving the lime slaker 62 contains sodium hydroxide and other impurities and is fed to a filter 67 where solids 68 are removed. The filtrate 69 is then fed to a multiple effect evaporator unit 70 where the filtrate solution 69 containing sodium hydroxide is concentrated, preferably to about a 46 to 47 percent sodium hydroxide solution 72. This solution 72 is fed to a flash tank (not shown) where additional water is flashed off thereby cooling and reducing the pressure of the solution 72 leaving the first effect evaporator as well as completing the concentration to produce 50 percent caustic. The caustic is further cooled in an exchanger or tank with cooling water coils 73 and is fed via stream 74 to a filter 75 where precipitated sodium chloride, sodium carbonate, and sodium sulfate are removed leaving a commercial grade 50 percent sodium hydroxide solution 77.

Figure 7:
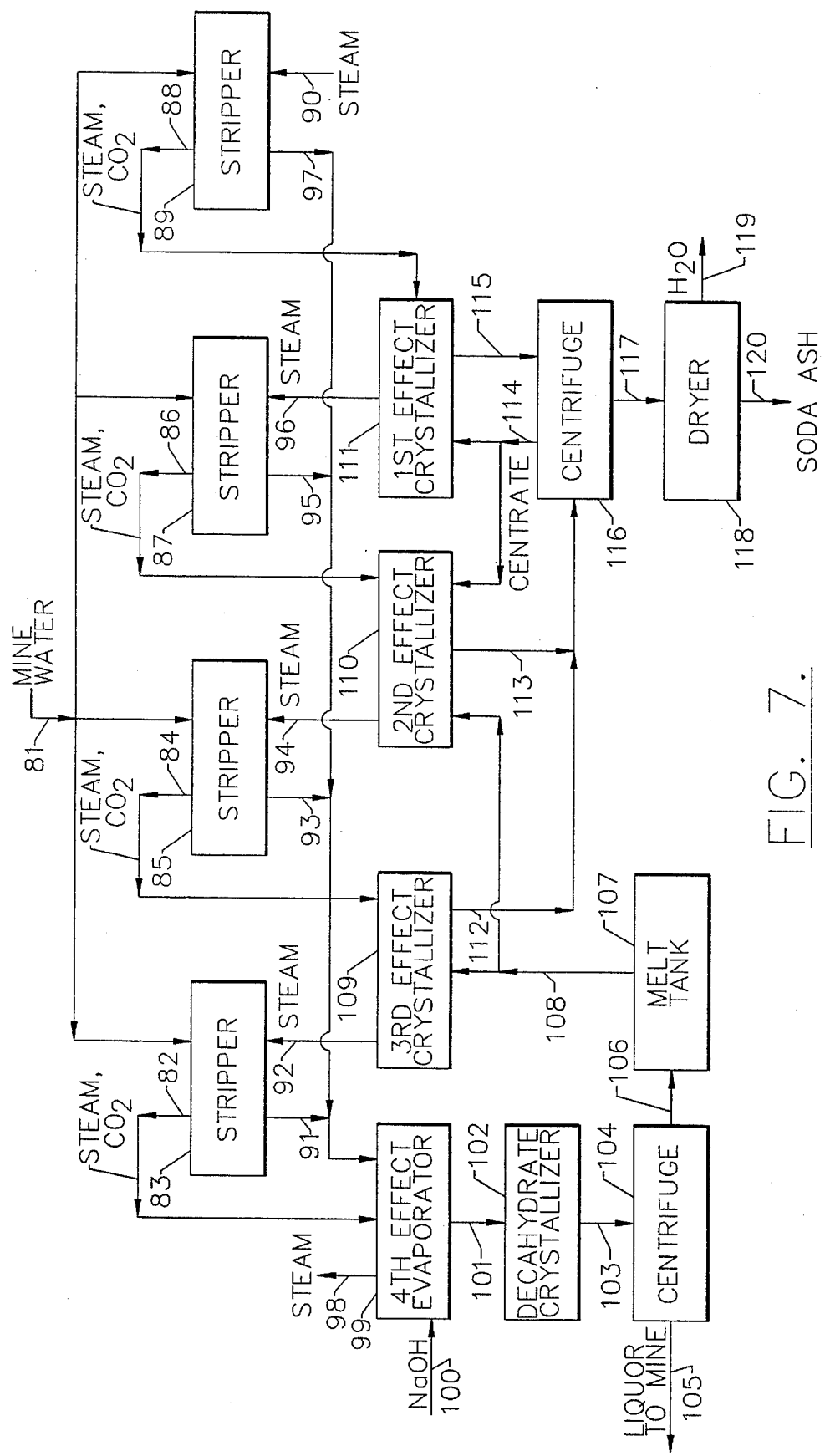
FIG. 7 is a flow diagram showing a process according to the invention wherein four strippers are used to produce soda ash.

FIG. 7 represents another useful process which incorporates the present invention. This process uses the large amount of steam available in a sodium carbonate monohydrate crystallizer train to reduce L/G ratios and accomplish significantly larger conversion of bicarbonate to carbonate. Mine water 81 is split into four streams and fed to four strippers 83, 85, 87, and 89. Preferably, each of the four mine water streams is preheated to about the operating temperature of the stripper to which it is to be fed in order to avoid significant condensation of water in the stripper. These temperatures range from about 50° C. to about 130° C. Steam 92 from the third effect evaporative crystallizer 109 is fed to stripper 83. Steam and carbon dioxide 82 exit stripper 83 and are fed to the fourth effect evaporator 99. Steam 94 from the second effect evaporative crystallizer 110 is fed to stripper 85 where steam and carbon dioxide are removed via stream 84 and fed to the third effect evaporative crystallizer 109. Similarly, steam 96 from the first effect evaporative crystallizer 111 is fed to stripper 87 and steam and carbon dioxide 86 leaves stripper 87 and are fed to the second effect evaporative crystallizer 110. Steam 90 destined for the first effect evaporative crystallizer 111 is first fed to stripper 89. The steam and carbon dioxide 88 leaving stripper 89 are then used to heat the first effect evaporative crystallizer 111. The stripped liquor 91, 93, 95 and 97 leaving the strippers 83, 85, 87 and 89 containing carbonate and remaining bicarbonate is fed to the fourth effect evaporator 99 where the liquor is concentrated. Sodium hydroxide 100 may be added, if necessary, to decompose enough bicarbonate to avoid downstream processing problems. Preferably, the system is designed to avoid the use of sodium hydroxide 100. Generally stream 101 will require bicarbonate levels less than about 1 to 2 percent to avoid sodium sesquicarbonate precipitation in the sodium carbonate decahydrate crystallization step. Steam 98 from the fourth effect evaporator goes to a barometric condenser (not shown). The concentrated solution 101 is fed to the decahydrate crystallizer 102 where the sodium carbonate solution is cooled to between about −3° C. and about 25° C. to form sodium carbonate decahydrate crystals. The resulting decahydrate crystal slurry is sent via stream 103 to the centrifuge 104 where the carbonate solution (liquor) is returned to the mine via stream 105. A purge stream (not shown) will be required at this point. The decahydrate crystals are fed via stream 106 to the melt tank 107 where they are heated to above 35° C. to form a solution of sodium carbonate which is fed via stream 108 to the third effect evaporative crystallizer 109 and the second effect evaporative crystallizer 110. Sodium carbonate monohydrate crystals are formed by heating and evaporation in these crystallizers 109, 110, and 111 from about 60° C. to about 110° C. and the resulting sodium carbonate monohydrate slurry leaves the crystallizers via streams 112, 113, and 115 and are fed to the centrifuge 116. Centrate containing dissolved sodium carbonate is fed via stream 114 to the first effect 111 and the second effect evaporative crystallizer 110. Sodium carbonate monohydrate crystals leave the centrifuge via stream 117 and are fed to the dryer 118 where water is removed via stream 119 to form soda ash 120.

Figure 8:
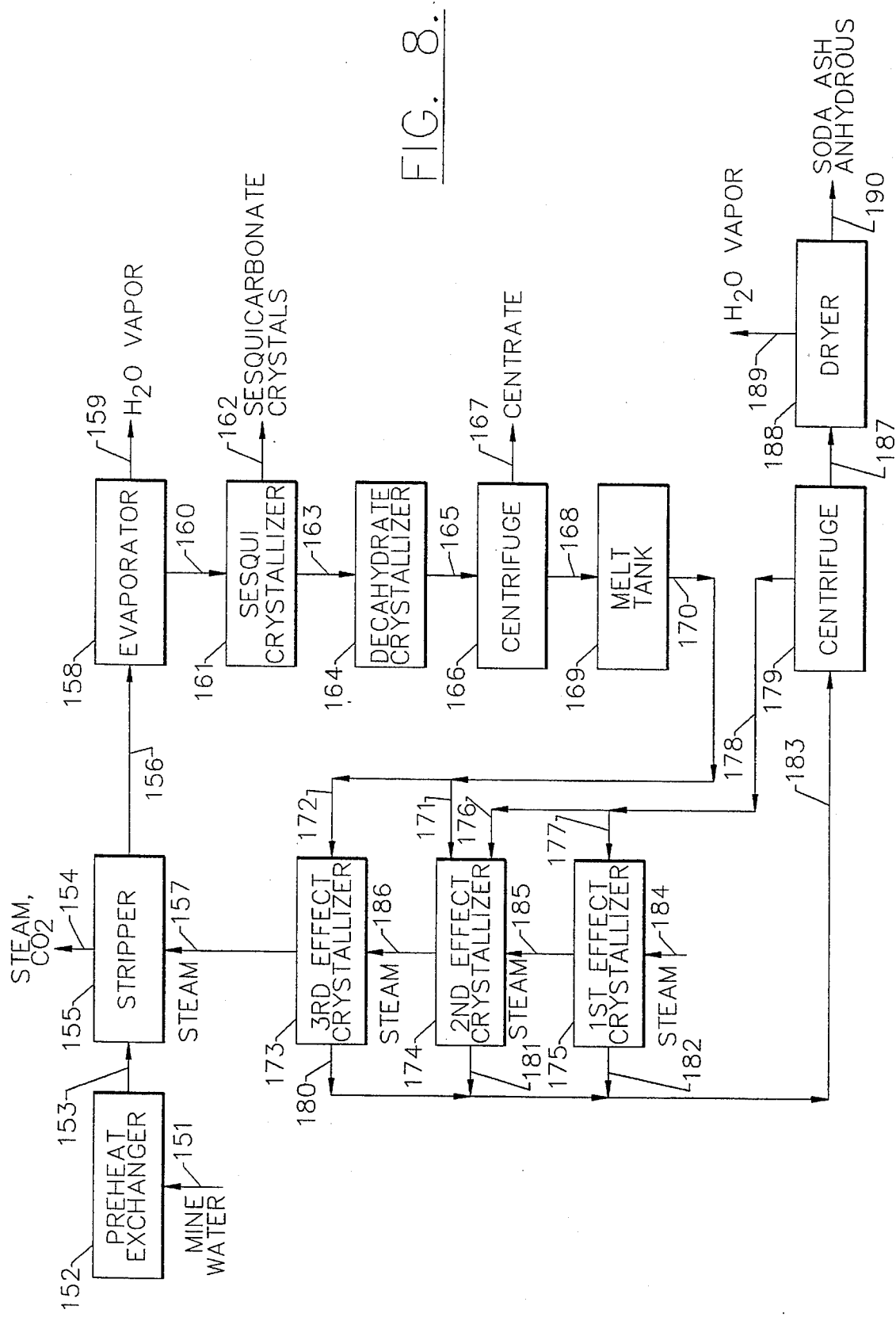
FIG. 8 is a flow diagram showing a process according to the present invention wherein an intermediate sodium sesquicarbonate crystallization step is used.

FIG. 8 represents yet another useful process incorporating the present invention. Mine water 151 is fed to a preheat exchanger 152 operating at about the temperature of the stripper. The mine water 151 may be filtered prior to being fed to the preheat exchanger 152 in order to remove unwanted solids. The mine water leaving the preheat exchanger via stream 153 is fed to a stripper 155 which operates at 55° C. to 70° C. Steam and carbon dioxide are removed from the stripper 155 via stream 154 and may be used as a heating medium in the preheat exchanger 152. The source of the steam 157 to the stripper 155 is the vapor from the third effect 173 of a triple effect sodium carbonate monohydrate evaporative crystallizer train as shown. The solution leaving the stripper via stream 156 containing carbonate and remaining bicarbonate is fed to an evaporator 158 where it is concentrated. The concentrated solution leaving the evaporator via stream 160 is fed to a sesquicarbonate crystallizer 161 which operates between about 25° C. to about 35° C. The sodium sesquicarbonate crystals containing sodium carbonate and sodium bicarbonate are removed via stream 162. The resulting solution is fed via stream 163 to a decahydrate crystallizer 164 which operates between about −3° C. and about 25° C. Sodium carbonate decahydrate crystals are formed and the resulting slurry 165 is fed to a centrifuge 166 where the centrate is removed via stream 167. The decahydrate crystals are fed via stream 168 to a melt tank 169 operating at above 35° C. Melting the sodium carbonate decahydrate forms a sodium carbonate solution which is fed via streams 171 and 172 to the second effect evaporative crystallizer 174 and the third effect evaporative crystallizer 173 where sodium carbonate monohydrate crystals are formed. A solution containing sodium carbonate monohydrate crystals leaves the second effect 174 and the third effect 173 via streams 181 and 180 which are combined with stream 182 containing sodium carbonate monohydrate crystals from the first effect evaporative crystallizer 175 and are combined into stream 183 and fed to centrifuge 179. The centrate leaving the centrifuge via stream 178 is fed to the second effect 174 and first effect 175 evaporative crystallizers. The sodium carbonate monohydrate crystals are fed via stream 187 to a dryer 188 where water vapor is removed forming soda ash 190. This same process can be practiced without the decahydrate crystallizer, but a neutralization step may be required to reduce the bicarbonate concentration to less than about 0.3 percent.

The processes described above have the advantage over the prior art in having lower energy requirements and larger maximum conversion ratios because they are able to use the abundant lower temperature steam available in a multiple effect monohydrate soda ash plant or in a chemical caustic soda plant, and in particular are able to use the waste steam these processes generate. In order to confirm that sodium bicarbonate can be decomposed to sodium carbonate in a stripper operating below about 90° C., tests were run, and the following results were obtained.

The present invention is demonstrated in greater detail in the following non-limiting examples, in which the term "STA" as used herein refers to the solution total alkalinity which is defined as the weight percent in solution of sodium carbonate plus the weight percent in solution of sodium bicarbonate, expressed in terms of its equivalent sodium carbonate content. The term "HTA" refers to the weight percent sodium bicarbonate in the solution, expressed in terms of its equivalent sodium carbonate content. The term HTA/STA ratio refers to the numerical value obtained by dividing the HTA value by the STA value. For example, a solution containing 10.0 weight percent $Na_2CO_3$ and 4.0 weight percent $NaHCO_3$ would have an HTA of 2.52 percent and a STA of 12.52 percent. The HTA/STA ratio is 0.20. The term L/G refers to the liquid to gas ratio for a stripping column and as used herein refers to the liquid feed rate in moles/hour of solvent (water) divided by the feed rate in moles/hour of the gas used for stripping. The feed rate of the bicarbonate-containing solution to the column is reported in milliliters per minute.

EXAMPLE 1

In order to determine the conversion of bicarbonate to carbonate according to the present invention, an aqueous solution containing 4.13 percent sodium bicarbonate and 14.96 percent sodium carbonate was fed to a one inch inside diameter glass column filled with borad rings at various rates. The tests were run using two heights of packing, 11 inches (corresponding to a 22.5 foot tall commercial column) and 38 inches (corresponding to a 75 foot tall column). The bicarbonate containing solution (mine water) was preheated to column temperatures by passing it through a tube wrapped in an electric heating mantle. During each test the steam rate was determined by condensing steam using a laboratory water-cooled condenser and collecting the condensate. The condensate was weighed, and the steam rate was calculated by dividing the weight by the time period during which the condensation was collected. The mine water flow rate was determined by collecting the column bottom effluent during the same time period as the condensate and weighing the effluent. A vacuum pump provided the low pressure necessary to perform the test at about 70° C. and at about 55° C. Tests were also run at about 96° C.

The feed and effluent samples were analyzed to determine the total alkalinity (percent TA), the sodium carbonate content (percent $Na_2CO_3$), and the sodium bicarbonate content (percent $NaHCO_3$). The decomposition of bicarbonate was determined by subtracting the bottoms HTA/STA value from the feed HTA/STA value, dividing by the feed value and multiplying by 100.

Table 2 contains a summary of the data obtained from 17 test runs using a column containing either 11 inches of packing or 38 inches of packing. Specifically, the table shows, for each test run, the temperature of the column and the height of the packing in the column, solution feed rate to the column, the L/G ratio, the HTA/STA ratio of mine water leaving the column (bottoms), and the decomposition of bicarbonate achieved. In all cases the mine water feed was 4.13 weight percent sodium bicarbonate, 14.96 weight percent sodium carbonate with a solution total alkalinity (STA) of 17.57 percent and a HTA/STA ratio of 0.148.

TABLE 2

| Run | Feed Rate ml/min. | L/G | Bottoms HTA/STA | % Decomp. |
|---|---|---|---|---|
| T = 97° C.; Packing = 11 inches | | | | |
| 1 | 8.14 | 2.60 | .075 | 49 |
| 2 | 4.36 | 1.51 | .047 | 68 |
| 3 | 1.88 | 0.72 | .019 | 87 |
| T = 69° C.; Packing = 11 inches | | | | |
| 4 | 20.18 | 5.01 | .130 | 12 |
| 5 | 9.48 | 2.37 | .121 | 18 |
| 6 | 5.76 | 1.96 | .102 | 31 |
| 7 | 1.64 | 0.44 | .069 | 53 |
| T = 57° C.; Packing = 11 inches | | | | |
| 8 | 3.27 | 1.43 | .112 | 24 |
| T = 96° C.; Packing = 38 inches | | | | |
| 9 | 14.95 | 3.56 | .051 | 66 |
| 10 | 9.66 | 2.36 | .045 | 70 |
| 11 | 6.51 | 1.62 | .027 | 82 |
| 12 | 3.81 | 0.96 | .014 | 91 |
| T = 72° C.; Packing = 38 inches | | | | |
| 13 | 5.55 | 1.17 | .064 | 57 |
| 14 | 3.47 | 1.16 | .041 | 72 |
| 15 | 2.45 | 0.69 | .035 | 76 |
| T = 56° C.; Packing = 38 inches | | | | |
| 16 | 4.61 | 1.65 | .083 | 44 |
| 17 | 1.68 | 0.42 | .046 | 69 |

Test runs 1, 2 and 3 show that the decomposition of bicarbonate proceeds further as the liquid to gas ratio is decreased which is predicted by comparison of the vapor equilibrium curves shown in FIGS. 3 and 4. Test runs 4, 5, 6 and 7 were performed at 69° C., test run 8 was performed at 57° C. These tests show the expected increase in decomposition as the L/G ratio is lowered. The effect of temperature can be seen by comparing tests with similar L/G ratios (1 and 5; 2, 6, and 8; 3 and 7). While there is a significant decrease in bicarbonate decomposition per unit length of packing as temperature decreases, as predicted, this decrease can be offset by increasing the height of the packing in the column. The decrease in decomposition is believed to be caused by the reduced efficiency of each theoretical plate resulting in an increased height equivalent of a theoretical plate (HETP), as discussed previously. The 96° C. tests with 38 inches of packing performed near the theoretical limits for an infinitely long column. While the test column was not long enough to show the expected increase in maximum conversion possible at lower temperatures, it is anticipated that tests run at higher temperatures and pressures would show the expected decrease in bicarbonate decomposition. These tests could not be run in the glass column because of the increased pressure required. Comparing test runs 6 and 7 with test runs 14 and 15, and also comparing test run 8 with test run 16 shows that increasing the mass transfer area significantly increases the decomposition of bicarbonate consistent with the claim that the reaction is one of equilibrium.

EXAMPLE 2

Tests were rerun according to the procedure outlined above using a feed solution having a TA of 19.47 percent and containing 6.44 percent sodium bicarbonate by weight. The results are shown in Table 3. These tests (18, 19 and 20) were run using 38 inches of packing and mine water spiked with additional bicarbonate (a 50 percent increase in bicarbonate). A comparison of test runs 18, 19, and 20 with test runs 10, 11, 12, and 15 show that the final bicarbonate concentration is not significantly increased when more bicarbonate is added to the feed. This result is entirely consistent with the equilibrium mechanism presented above and quite different from a thermal decomposition process where the stripping operation is only removing the bicarbonate decomposed thermally.

TABLE 3

| Run | Feed Rate ml/min. | L/G | Bottoms HTA/STA | % Decomp. |
|---|---|---|---|---|
| T = 96° C.; Packing = 38 inches | | | | |
| 18 | 7.30 | 1.80 | .021 | 90 |
| 19 | 4.82 | 1.10 | .026 | 88 |
| T = 71° C.; Packing = 38 inches | | | | |
| 20 | 3.37 | 0.80 | .034 | 84 |

EXAMPLE 3

Tests 21 through 23 were run, as outlined in Example 1 in the column containing 38 inches of packing. The feed solution, however, contained 23.39 percent sodium carbonate and 5.79 percent sodium bicarbonate, at levels adequate to simulate concentrated mine water. The feed solution had a total HTA/STA ratio of 0.135 and a solution total alkalinity of 27.04 percent. These tests show that even at higher total alkalinity concentrations, overall bicarbonate decomposition still occurs. Based on a comparison of results from test runs 12 and 17, significant bicarbonate decomposition should also occur at temperatures below about 90° C.

TABLE 4

| Run | Feed Rate ml/min. | L/G | Bottom HTA/STA | % Decomp. |
|---|---|---|---|---|
| T = 95° C.; Packing = 38 inches | | | | |
| 21 | 13.1 | 2.93 | .061 | 55 |
| 22 | 13.1 | 2.65 | .061 | 55 |
| 23 | 3.94 | 0.81 | .042 | 69 |

The foregoing examples are illustrative of the present invention and are not to be taken as restrictive thereof. The invention is defined by the following claims, with equivalents of the claims to be included therein.

That which is claimed is:

1. A method of reducing the bicarbonate content of an aqueous solution containing sodium bicarbonate comprising:
    contacting an aqueous solution that contains sodium bicarbonate with steam that has a temperature of below 90° C. for a time adequate for the steam to cause a sufficient amount of carbon dioxide to leave the aqueous solution to reduce the amount of bicarbonate ion in the solution by converting the bicarbonate to carbonate as the carbon dioxide leaves the solution.

2. A method according to claim 1, wherein the step of contacting the aqueous solution with steam comprises contacting the aqueous solution with steam from a multiple effect evaporator or evaporative crystallizer.

3. A method according to claim 2 wherein the step of contacting the aqueous solution with steam from a multiple effect evaporator or evaporative crystallizer comprises contacting the aqueous solution with steam from a multiple effect evaporative crystallizer used to form sodium carbonate monohydrate.

4. A method according to claim 2 wherein the step of contacting the aqueous solution with steam from a multiple effect evaporator or evaporative crystallizer comprises contacting the aqueous solution with steam from a multiple effect evaporator used to concentrate a sodium hydroxide solution.

5. A method according to claim 2, wherein the step of contacting the aqueous solution with steam from a multiple effect evaporator or evaporative crystallizer comprises contacting the aqueous solution with steam from the last effect of a multiple effect evaporative crystallizer or evaporator operating at a temperature below about 70° C.

6. A method according to claim 2, wherein the step of contacting the aqueous solution with steam from a multiple effect evaporator or evaporative crystallizer comprises contacting the aqueous solution with steam from an intermediate effect of a multiple effect evaporative crystallizer or evaporator operating at a temperature below about 90° C.

7. A method according to claim 1 wherein the step of contacting the aqueous solution with steam comprises varying the proportional amount of steam contacting the aqueous solution to thereby vary the conversion of bicarbonate to carbonate from a minimum conversion of bicarbonate to a maximum conversion of bicarbonate.

8. A method according to claim 1, wherein the step of contacting the aqueous solution with steam comprises contacting the aqueous solution with steam from a power generating facility.

9. A method according to claim 7 wherein the step of contacting the aqueous solution with steam comprises using an L/G ratio of from about 0.2 to 20.

10. A method according to claim 1, wherein the solution containing sodium bicarbonate has a total alkalinity of between about 5 and 32 percent by weight.

11. A method according to claim 1 further comprising the step of forming the aqueous solution from a sodium bicarbonate-containing composition.

12. A method according to claim 11 wherein the step of forming an aqueous solution from a sodium bicarbonate-containing composition comprises forming the aqueous solution from a bicarbonate-containing composition so that the aqueous solution has a total alkalinity of from about 5 to 25 percent.

13. A method according to claim 11 wherein the step of forming the aqueous solution comprises treating a naturally occurring aqueous solution to remove impurities that would otherwise interfere with the remaining process steps.

14. A method according to claim 11 wherein the step of forming the aqueous solution comprises forming the solution from water and a composition selected from the group consisting of trona and nahcolite.

15. A method according to claim 11 wherein the step of forming the aqueous solution comprises forming the solution from an aqueous solution that contains between about 0 and 15 weight percent sodium carbonate and between about 0 and 3 weight percent sodium bicarbonate, and a composition selected from the group consisting of trona and nacholite.

16. A method according to claim 11 wherein the step of forming the aqueous solution comprises forming the solution from an aqueous sodium hydroxide solution that contains between about 0 and 8 weight percent sodium hydroxide and between about 0 and 15 weight percent sodium carbonate, and a composition selected from the group consisting of trona and nahcolite.

17. A method according to claim 1 further comprising the step of adding an alkali selected from the group consisting of sodium hydroxide, calcium oxide, and calcium hydroxide to the aqueous solution after the aqueous solution has been contacted with the gas to thereby convert the remaining bicarbonate in the remaining solution to carbonate.

18. A method of producing sodium-containing salts from sodium bicarbonate-containing compositions in a generally energy-efficient manner, the method comprising:

contacting an aqueous solution of a sodium bicarbonate-containing composition with steam that has a temperature of below 90° C. for a time adequate for the steam to cause a sufficient amount of carbon dioxide to leave the aqueous solution to reduce the amount of bicarbonate ion in the solution by converting the bicarbonate to carbonate as the carbon dioxide leaves the solution; and thereafter converting the remaining solution to sodium salts.

19. A method according to claim 18 wherein the step of converting the remaining solution to sodium salts comprises heating the solution to a temperature between about 60° C. and 110° C. to thereby evaporate water and form sodium carbonate monohydrate.

20. A method according to claim 19 further comprising the step of adding sodium hydroxide to the solution in an amount sufficient to reduce the remaining bicarbonate to no more than about 0.3 weight percent prior to the step of heating the solution to a temperature between about 60° C. and 110° C.

21. A method according to claim 19 further comprising the step of drying the sodium carbonate monohydrate to anhydrous sodium carbonate.

22. A method according to claim 18 further comprising the step of adding calcined trona to the remaining solution to increase the carbonate concentration in the remaining solution to between about 8 and 32 percent.

23. A method according to claim 18 wherein the step of converting the remaining solution to sodium salts comprises:

heating the solution to evaporate water; and thereafter cooling the solution to a temperature of between about −3° C. and 25° C. to crystallize solid sodium carbonate decahydrate.

24. A method according to claim 23 further comprising the steps of:

separating the crystallized sodium carbonate decahydrate from the solution;

heating the solid sodium carbonate decahydrate to form a sodium carbonate solution; and thereafter heating the sodium carbonate solution to a temperature of between about 60° C. and 110° C. to evaporate water and to form sodium carbonate monohydrate; and separating the sodium carbonate monohydrate crystals; and heating the sodium carbonate monohydrate to evaporate water to form anhydrous sodium carbonate.

25. A method according to claim 18 wherein the step of converting the remaining solution to sodium salts comprises adding an alkali from the group consisting of calcium oxide and calcium hydroxide to convert the remaining solution to a sodium hydroxide solution.

26. A method according to claim 18 wherein the step of converting the remaining solution to sodium salts comprises:

heating the remaining solution to evaporate water therefrom;

cooling the resulting solution to form solid crystals of sodium carbonate decahydrate;

separating the crystallized sodium carbonate decahydrate from the solution;

heating the sodium carbonate decahydrate crystals to form a sodium carbonate solution; and heating the sodium carbonate solution to a temperature of between about 60° C. and about 110° C. to evaporate water and to form sodium carbonate monohydrate; and separating the sodium carbonate monohydrate crystals; and heating the sodium carbonate monohydrate to evaporate water to form anhydrous sodium carbonate.

27. A method according to claim 26 further comprising the step of adding a sufficient amount of sodium hydroxide to reduce the remaining bicarbonate in the resulting aqueous solution to no more than about 2 weight percent prior to the step of cooling the resulting solution to form solid crystals of sodium carbonate decahydrate.

28. A method according to claim 18 wherein the step of converting the remaining solution to sodium salts comprises:

heating the remaining solution to evaporate water;

cooling the solution to crystallize sodium sesquicarbonate;

separating the solid sodium sesquicarbonate crystals from the solution;

further cooling the solution to form solid crystals of sodium carbonate decahydrate;

separating the solid crystals of sodium carbonate decahydrate from the solution;

heating the sodium carbonate decahydrate to form a sodium carbonate solution;

thereafter heating the sodium carbonate solution to a temperature of between about 60° C. and 110° C. to evaporate water therefrom and to form sodium carbonate monohydrate crystals; and heating the sodium carbonate monohydrate crystals to evaporate water and form anhydrous sodium carbonate crystals.

29. A method of reducing the ratio of sodium bicarbonate alkalinity to total alkalinity to below about 0.09 for an aqueous solution containing sodium bicarbonate comprising:

contacting the aqueous solution with steam at a temperature of below 90° C. in an amount and for a time adequate for the steam to cause a sufficient amount of carbon dioxide to leave the aqueous solution to reduce the ratio of sodium bicarbonate alkalinity to total alkalinity in the solution to below about 0.09 by converting the bicarbonate to carbonate as the carbon dioxide leaves the solution.

30. A method according to claim 29, wherein the step of contacting the aqueous solution with a gas comprises adjusting an L/G ratio so that the final ratio of sodium bicarbonate alkalinity to total alkalinity is less than 0.09.

31. A method according to claim 29, wherein the step of contacting the aqueous solution with steam comprises contacting the aqueous solution with steam from a multiple effect evaporator or evaporative crystallizer.

32. A method according to claim 31 wherein the step of contacting the aqueous solution with steam from a multiple effect evaporator or evaporative crystallizer comprises contacting the solution with steam from an evaporative crystallizer effect used to form sodium carbonate monohydrate.

33. A method according to claim 31 wherein the step of contacting the aqueous solution with steam from a multiple effect evaporator or evaporative crystallizer comprises contacting the solution with steam from a multiple effect evaporator used to concentrate a sodium hydroxide solution.

34. A method according to claim 30, wherein the step of adjusting an L/G ratio so that the final ratio of sodium bicarbonate alkalinity to total alkalinity is less than 0.09 comprises adjusting the L/G ratio so that it is less than about 2.0.

35. A method according to claim 29, wherein the step of contacting the aqueous solution with steam comprises adjusting an L/G ratio to produce a final ratio of sodium bicarbonate alkalinity to total alkalinity low enough to avoid the need for adding alkalis from the group consisting of sodium hydroxide, calcium hydroxide, or calcium oxide in downstream processing steps where the presence of substantial levels of bicarbonate would be deleterious.

36. A method according to claim 35, wherein the step of adjusting an L/G ratio comprises adjusting the L/G ratio so that the final ratio of sodium bicarbonate alkalinity to total alkalinity of the aqueous solution is less than 0.05.

37. A method according to claim 29, wherein the step of contacting the aqueous solution with steam comprises contacting the aqueous solution with steam supplied from a power generating facility.

38. A method according to claim 29, wherein the aqueous solution containing sodium bicarbonate has a total alkalinity of between about 5% and 32% by weight.

39. A method according to claim 29 further comprising the step of forming an aqueous solution from a sodium bicarbonate-containing composition prior to the step of contacting the aqueous solution with the gas.

40. A method according to claim 39 wherein the step of forming an aqueous solution of a sodium bicarbonate-containing composition comprises forming the aqueous solution from a bicarbonate-containing composition so that the aqueous solution has a total alkalinity of from about 5 to 25 percent.

41. A method according to claim 39 wherein the step of forming the aqueous solution comprises treating a naturally-occurring aqueous solution to remove materials that would otherwise interfere with the remaining process steps.

42. A method according to claim 39 wherein the step of forming the aqueous solution comprises forming the solution from water and a composition selected from the group consisting of trona and nahcolite.

43. A method according to claim 39 wherein the step of forming the aqueous solution comprises forming the solution from an aqueous solution that contains between about 0 and 15 weight percent sodium carbonate and between about 0 and 3 weight percent sodium bicarbonate and a composition selected from the group consisting of trona and nahcolite.

44. A method according to claim 39 wherein the step of forming the aqueous solution comprises forming the solution from an aqueous sodium hydroxide solution that contains between about 0 and 8 weight percent sodium hydroxide and about 0 and 15 weight percent sodium carbonate and a composition selected from the group consisting of trona and nahcolite.

45. A method according to claim 29 further comprising the step of adding an alkali selected from the group consisting of sodium hydroxide, calcium oxide, and calcium hydroxide to the solution to thereby convert remaining bicarbonate in the aqueous solution to carbonate.

46. A method of producing sodium-containing salts from sodium bicarbonate-containing compositions in a generally energy-efficient manner, the method comprising:

contacting an aqueous solution of a sodium bicarbonate-containing composition with steam at a temperature below 90° C. in an amount and for a time adequate for the steam to cause a sufficient amount of carbon dioxide to leave the aqueous solution to reduce the ratio of sodium bicarbonate alkalinity to total alkalinity in the solution to less than 0.09 and converting bicarbonate to carbonate as the carbon dioxide leaves the solution; and thereafter converting the remaining solution to sodium salts.

47. A method according to claim 46 wherein the step of converting the remaining solution to sodium salts comprises heating the solution to a temperature of between about 60° C. and 110° C. to thereby evaporate water and form sodium carbonate monohydrate.

48. A method according to claim 47 further comprising the step of adding sodium hydroxide to the solution in an amount sufficient to reduce the remaining bicarbonate to no more than about 0.3 weight percent prior to heating the solution to a temperature of between about 60° C. and 110° C.

49. A method according to claim 47 further comprising the step of drying the sodium carbonate monohydrate to form anhydrous sodium carbonate.

50. A method according to claim 46 further comprising the step of adding calcined trona to the remaining solution to increase the carbonate concentration in the remaining solution to between about 8 and 32 percent.

51. A method according to claim 51 wherein the step of converting the remaining solution to sodium salts comprises:

heating the solution to evaporate water; and thereafter cooling the solution to a temperature of between about −3° C. and 25° C. to crystallize solid sodium carbonate decahydrate.

52. A method according to claim 51 further comprising the steps of:

separating the crystallized sodium carbonate decahydrate from the solution;

heating the solid sodium carbonate decahydrate to form a sodium carbonate solution; and thereafter heating the sodium carbonate solution to a temperature of between about 60° C. and 110° C. to evaporate water and to form sodium carbonate monohydrate; and separating the sodium carbonate monohydrate crystals; and heating the sodium carbonate monohydrate to evaporate water to form anhydrous sodium carbonate.

53. A method according to claim 46 wherein the step of converting the remaining solution to other sodium salts comprises adding an alkali from the group consisting of calcium oxide and calcium hydroxide to convert the aqueous solution to a sodium hydroxide solution.

54. A method according to claim 46 wherein the step of converting the remaining solution to sodium salts comprises:

heating the remaining solution to evaporate water therefrom;

cooling the resulting solution to form solid crystals of sodium carbonate decahydrate;

separating the crystallized sodium carbonate decahydrate from the solution;

heating the sodium carbonate decahydrate crystals to form a sodium carbonate solution; and heating the sodium carbonate solution to a temperature of between about 60° C. and about 110° C. to evaporate water and to form sodium carbonate monohydrate; and separating the sodium carbonate monohydrate crystals; and heating the sodium carbonate monohydrate to evaporate water to form anhydrous sodium carbonate.

55. A method according to claim 54 further comprising the step of adding a sufficient amount of sodium hydroxide to reduce the remaining bicarbonate in the resulting aqueous solution to no more than about 2 weight percent prior to the step of cooling the resulting solution to form solid crystals of sodium carbonate decahydrate.

\* \* \* \* \*

UNITED STATES PATENT AND TRADEMARK OFFICE
CERTIFICATE OF CORRECTION

PATENT NO. : 5,609,838

DATED : March 11, 1997

INVENTOR(S) : Neuman et al.

It is certified that error appears in the above-indentified patent and that said Letters Patent is hereby corrected as shown below:

On the title page, Col. 2, in the Abstract, line 5, "predominately" should be --predominantly--.

On page 2, Other Publications, Col. 1, line 1, "Manweiler" should be --Mannweiler--.

On page 2, Other Publications, Col. 1, lines 9 and 13, "Desportion" should be --Desorption".

Col. 1, line 34, "$Na_2CO_3 \cdot NaHCO_b \cdot 2H_2O$" should be --$Na_2CO_3 \cdot NaHCO_3 \cdot 2H_2O$--.

Col. 3, line 50, after "et al." insert --U.S. Patent No. 4,252,781--.

Col. 4, line 39, in the sub-heading, "OBJECT" should be --OBJECTS--.

Col. 5, line 65 and Col. 6, line 28, "predominately" should be --predominantly--.

Col. 10, Equation 11, "H+" should be --$H^+$--.

Col. 10, line 11, "equation 10" should be --equation (10)--.

UNITED STATES PATENT AND TRADEMARK OFFICE
CERTIFICATE OF CORRECTION

PATENT NO. : 5,609,838
DATED : March 11, 1997
INVENTOR(S) : Neuman et al.

It is certified that error appears in the above-indentified patent and that said Letters Patent is hereby corrected as shown below:

Col. 11, line 2, after "TABLE" insert a sub-heading --Equilibrium Conditions at 25°C--.

Col. 11, line 12, after "*" insert -- = --.

Col. 12, line 58, "10" should be --1.0--.

Col. 14, line 59, after "stream" insert --5--.

Col. 19, line 28, in the sub-heading "7" should be --T--.

Col. 19, line 49, "Bottom" should be --Bottoms--.

Col. 21, line 4, "nacholite" should be --nahcolite--.

Col. 24, line 44, "51" (second occurrence) should be --46--.

Signed and Sealed this

Twenty-third Day of September, 1997

Attest:

BRUCE LEHMAN

Attesting Officer

Commissioner of Patents and Trademarks